United States Patent
Kobayashi et al.

(10) Patent No.: US 7,716,044 B2
(45) Date of Patent: May 11, 2010

(54) SOUND COLLECTING METHOD AND SOUND COLLECTING DEVICE

(75) Inventors: Kazunori Kobayashi, Tokyo (JP); Kenichi Furuya, Saitama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1556 days.

(21) Appl. No.: 10/510,955

(22) PCT Filed: Feb. 6, 2004

(86) PCT No.: PCT/JP2004/001261

§ 371 (c)(1), (2), (4) Date: Oct. 29, 2004

(87) PCT Pub. No.: WO2004/071130

PCT Pub. Date: Aug. 19, 2004

(65) Prior Publication Data

US 2005/0216258 A1 Sep. 29, 2005

(30) Foreign Application Priority Data

Feb. 7, 2003 (JP) .............................. 2003-030676
Mar. 5, 2003 (JP) .............................. 2003-058626

(51) Int. Cl.
G10L 19/14 (2006.01)
(52) U.S. Cl. .................................................. 704/205
(58) Field of Classification Search ................ 704/200, 704/205
See application file for complete search history.

(56) References Cited

U.S. PATENT DOCUMENTS 6,771,219 B2 * 8/2004 Sim .......................... 342/382
(Continued)

FOREIGN PATENT DOCUMENTS

JP 05-244043 9/1993
(Continued)

OTHER PUBLICATIONS

Mapes-Riordan et al, "Echo Control in Teleconferencing Using Adaptive Filters", 95th Convention, Oct. 7, 1993, pp. 1-11.*
(Continued)

*Primary Examiner*—Angela A Armstrong
(74) *Attorney, Agent, or Firm*—Oblon, Spivak, McClelland, Maier & Neustadt, L.L.P.

(57) ABSTRACT

Upon detecting an utterance period by a state decision part 14, a sound source position detecting part 15 detects the positions of sound sources $9_1$ to $9_K$ are detected by a sound source position detecting part 15, then covariance matrix of acquired signals are calculated by a covariance matrix calculating part 18 in correspondence to the respective sound sources, and stored in a covariance matrix storage part 18 in correspondence to the respective sound sources. The acquired sound level for each sound source is estimated by an acquired sound level estimating part 19 from the stored covariance matrix, and filter coefficients are determined by a filter coefficient calculating part 21 from the estimated acquired sound levels and the covariance matrices, and the filter coefficients are set in filters $12_1$ to $12_M$. Acquired signals from the respective microphones are filtered by the filters, then the filtered outputs are added together by an adder 13, and the added output is provided as a send signal; by this, it is possible to generate send signals of desired levels irrespective of the positions of sound sources.

17 Claims, 18 Drawing Sheets

U.S. PATENT DOCUMENTS

| | | | |
|---|---|---|---|
| 7,158,933 B2 * | 1/2007 | Balan et al. | 704/226 |
| 7,218,741 B2 * | 5/2007 | Balan et al. | 381/92 |

FOREIGN PATENT DOCUMENTS

| | | | |
|---|---|---|---|
| JP | 08-250944 | | 9/1996 |
| JP | 10-190848 | | 7/1998 |
| JP | 11-18194 | | 1/1999 |
| JP | 2002-062895 | | 2/2002 |
| JP | 2002-149190 | | 5/2002 |
| JP | 2002-335194 | | 11/2002 |
| WO | WO 01/37435 | * | 5/2001 |
| WO | WO 01/37435 A2 | | 5/2001 |

OTHER PUBLICATIONS

Dirk Van Compernolle, "Switching Adaptive Filters for Enhancing Noisy and Reverberant Speech from Microphone Array Recordings", IEEE Proc. ICASSP 1990, XP-10641865, Apr. 3, 1990, pp. 833-836.

Kazunori Kobayashi, et al., "A Talker-Tracking Microphone Array for Teleconferencing Systems", AES $113^{TH}$ Convention, XP-002385435, Oct. 2002, pp. 1-7.

Dan Mapes-Riordan, et al.,"Echo Control in Teleconferencing Using Adaptive Filters", $95^{TH}$ Convention, XP-002385436, Oct. 7, 1993, pp. 1-11.

Tanaka, Masashi, et al. "Performance of sound source direction estimation methods under reverberant conditions", Journal of the Society of Acoustic Engineers of Japan, pp. 291-292, Jan. 22, 2003.

Dirk Van Compernolle, "Switching Adaptive Filters for Enhancing Noisy and Reverberant Speech from Microphone Array Recordings", IEEE Proc. ICASSP 1990, XP-10641865, Apr. 3, 1990, pp. 833-836.

Kazunori Kobayashi, et al., "A Talker-Tracking Microphone Array for Teleconferencing Systems", AES $113^{TH}$ Convention, XP-002385435, Oct. 2002, pp. 1-7.

Dan Mapes-Riordan, et al.,"Echo Control in Teleconferencing Using Adaptive Filters", $95^{TH}$ Convention, XP-002385436, Oct. 7, 1993, pp. 1-11.

Tanaka, Masashi et al. "Performance of sound source direction estimation methods under reverberant conditions", Journal of the Society of Acoustic Engineers of Japan, vol. 50, No. 7, pp. 540-548, 1994.

* cited by examiner

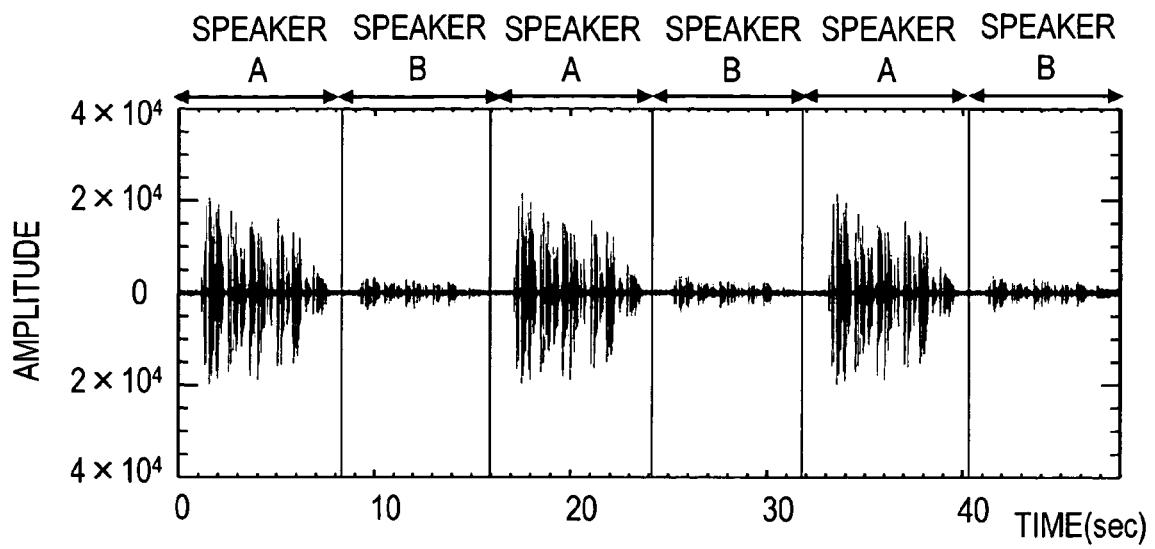
FIG. 18A   BEFORE PROCESSING
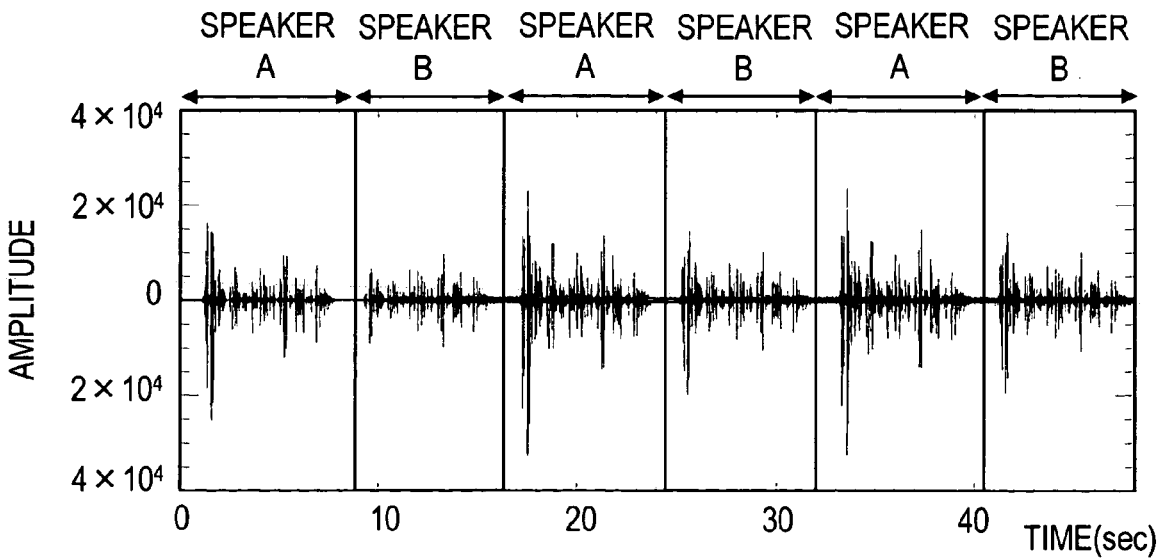
FIG. 18B   AFTER PROCESSING

US 7,716,044 B2

SOUND COLLECTING METHOD AND SOUND COLLECTING DEVICE

TECHNICAL FIELD

The present invention relates to a sound acquisition method and a sound acquisition apparatus and, more particularly, to a sound acquisition method and a sound acquisition apparatus that acquire speech sounds from a plurality of speech sound sources and adjust their volume before outputting.

PRIOR ART

For example, in a teleconference in which persons at different remote locations participate, if a single microphone is used at each location to acquire speech sounds of plural participants sitting at different positions at each remote location, received signal levels greatly differ because of different distances from the participants to the microphone and different volumes of their speech sounds. At the remote receiving side the reproduced speech sounds greatly differ in volume with the participants at the transmitting side and, in some cases, they are hard to distinguish one participant from another.

FIG. 20 illustrates in block form the basic configuration of a conventional sound acquisition apparatus disclosed, for example, in Japanese Patent Application Kokai Publication 8-250944. The conventional sound acquisition apparatus is made up of a microphone 41, a power calculating part 42, an amplification factor setting part 43, and an amplifier 44. The power calculating part 42 calculates a long-time mean power $P_{ave}$ of the signal received by the microphone 41. The long-time mean power can be obtained by squaring the signal and time-integrating the squared output. Next, the amplification factor setting part 43 sets an amplification factor G based on the long-time mean power $P_{ave}$ of the received signal calculated by the power calculating part 42 and a preset desired sending level $P_{opt}$. The amplification factor G can be calculated, for example, by the following equation (1).

$$G=(P_{opt}/P_{ave})^{1/2} \qquad (1)$$

The amplifier 44 amplifies the microphone received signal by the set amplification factor G and outputs the amplified signal.

By the processing described above, the output signal power is put to the desired sending level $P_{opt}$, by which the volume is automatically adjusted. With the conventional sound acquisition method, however, since the amplification factor is determined based on the long-time mean power, a delay of several to tens of seconds develops in the setting of an appropriate amplification factor. Accordingly, in the case where plural speakers are present and their speech sounds are acquired by the microphone at different levels, there arises a problem that whenever the speakers changes from one to another, setting of an appropriate amplification factor delays, resulting in an the speech sound being reproduced at an inappropriate volume.

An object of the present invention is to provide a sound acquisition apparatus and a sound acquisition method that, even where plural speakers are present and their speech sounds are picked up by a microphone at different levels, automatically adjust the volume of each speech sound to an appropriate value, and a program for implementing the method.

DISCLOSURE OF THE INVENTION

A sound acquisition method for acquiring sound from each sound source by microphones of plural channels according to the present invention, comprises:

(a) a state deciding step including an utterance deciding step of deciding an utterance period from signals received by said plural-channel microphones;

(b) a sound source position detecting step of detecting the position of said each sound source from said received signals when the utterance period is decided in said utterance deciding step;

(c) a frequency domain converting step of converting said received signals to frequency domain signals;

(d) a covariance matrix calculating step of calculating a covariance matrix of said frequency domain received signals;

(e) a covariance matrix storage step of storing said covariance matrix for each sound source based on the result of detection in said sound position detecting step;

(f) a filter coefficient calculating step of calculating filter coefficients of said plural channels based on said stored covariance matrix and a predetermined output level;

(g) a filtering step of filtering the received signals of said plural channels by filter coefficients of said plural channels, respectively; and (h) an adding step of adding together the results of filtering in said plural channels, and providing the added output as a send signal.

According to the present invention, a sound acquisition apparatus which acquires sound from each sound source by microphones of plural channels placed in an acoustic space, comprises:

a state decision part including an utterance deciding part for deciding an utterance period from signals received by said plural-channel microphones;

a sound source position detecting part for detecting the position of said each sound source from said received signals when the utterance period is decided by said utterance deciding part;

a frequency domain converting part for converting said received signals to frequency domain signals; a covariance matrix calculating part for calculating a covariance matrix of said frequency domain received signals of said plural channels;

a covariance matrix storage part for storing said covariance matrix for said each sound source based on the result of detection by said sound position detecting part;

a filter coefficient calculating part for calculating filter coefficients of said plural channels by use of said stored covariance matrix so that the send signal level for said each sound source becomes a desired level;

filters of said plural channels for filtering the received signals from said microphones by use of the filter coefficients of said plural channels, respectively; and an adder for adding together the outputs from said filters of said plural channels and for providing the added output as a send signal.

According to a second aspect of the present invention, a sound acquisition method for acquiring speech sound from at least one sound source by a microphone of at least one channel in an acoustic space in which a received signal is reproduced by a loudspeaker, comprises:

(a) a state deciding step of deciding an utterance period and a receiving period from the sound acquired by said microphone of said at lest one channel and said received signal;

(b) a frequency domain converting step of converting said acquired signal and said received signal to frequency domain signals;

(c) a covariance matrix calculating step of calculating a covariance matrix in said utterance period and a covariance in said receiving period from said frequency domain acquired signal and received signal;

(d) a covariance matrix storage step of storing said covariance matrices for said utterance period and for said receiving period, respectively;

(e) a filter coefficient calculating step of calculating filter coefficients for said acquired signal of said at least one channel and filter coefficients for said received signal based on said stored covariance matrices in said utterance period and said receiving period so that an acoustic echo, which is a received signal component contained in said received signal is cancelled;

(f) a filtering step of filtering said received signal and said acquired signal by use of said filter coefficients for said received signal and filter coefficients for said acquired signal of said at least one channel; and (g) an adding step of adding together said filtered signals and providing the added output as a send signal.

A sound acquisition apparatus according to the second aspect of the present invention comprises:

a microphone of at least one channel for acquiring speech sound from a sound source and for outputting an acquired signal;

a loudspeaker for reproducing a received signal;

a state decision part for deciding an utterance period and a receiving period from said acquired signal and said received signal;

a frequency domain converting part for converting said acquired signal and said received signal to frequency domain signals;

a covariance matrix calculating part for calculating covariance matrices of said acquired and received signals of said frequency domain for said utterance period and for said receiving period, respectively;

a covariance matrix storage part for storing said covariance matrices for said utterance period and for said receiving period, respectively;

a filter coefficient calculating part for calculating filter coefficients for said acquired signal of said at least one channel and filter coefficients for said received signal based on said stored covariance matrices so that an acoustic echo of said received signal is cancelled;

an acquired signal filter and a received signal filter having set therein said filter coefficients for said acquired signal and said filter coefficients for said received signal, for filtering said acquired signal and for filtering said received signal; and an adder for adding together the outputs from said acquired signal filter and said received signal filter, and for providing the added output as a send signal.

According to the present invention, even when plural speakers are present ad their speech sounds are acquired by a plurality of microphones at different levels, the directivity of the microphones is appropriately controlled to automatically adjust the volume of the speech sound to an appropriate value for each speaker.

BRIEF DESCRIPTION OF THE DRAWINGS

FIG. 18A is a diagram showing simulated speech waveforms of speakers A and B before processing by the first embodiment.

FIG. 18B is a diagram showing simulated speech waveforms of speakers A and B after processing by the first embodiment.

BEST MODE FOR CARRYING OUT THE INVENTION

First Embodiment

Figure 1:
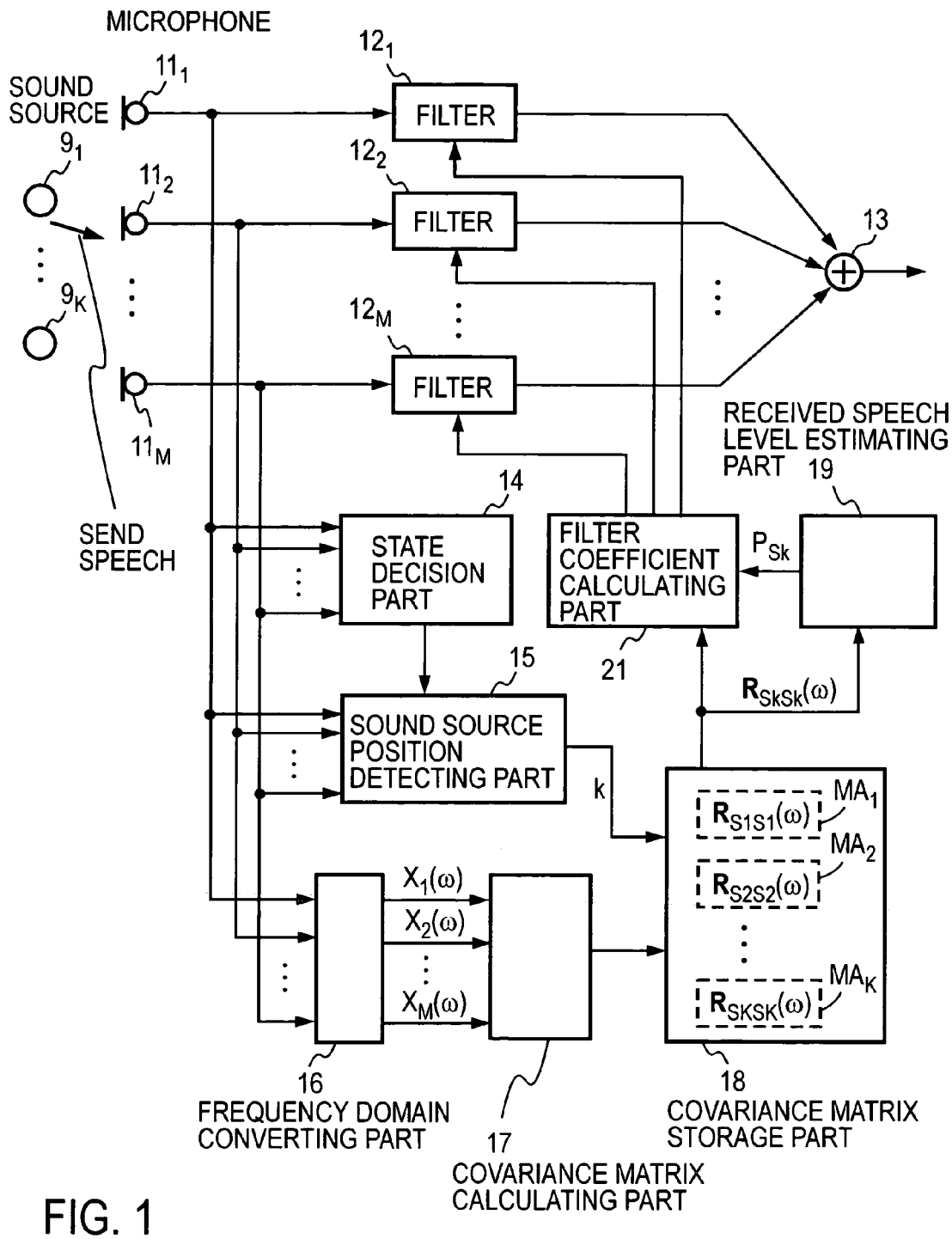
FIG. 1 is a block diagram illustrating a sound acquisition apparatus according to a first embodiment of the present invention.

FIG. 1 is a block diagram of a sound acquisition apparatus according to a first embodiment of the present invention. The sound acquisition apparatus of this embodiment comprises microphones $11_1$ to $11_M$ of M channels disposed in an acoustic space, filters $12_1$ to $12_M$, an adder 13, a state decision part 14, a sound source position detecting part 15, a frequency domain converting part 16, a covariance matrix calculating part 17, a covariance matrix storage part 18, an acquired sound level estimating part 19, and a filter coefficient calculating part 21.

In this embodiment, the positions of speech sound sources $9_1$ to $9_K$ in an acoustic space are detected, then covariance matrices of acquired signals in the frequency domain for the respective speech sound sources are calculated and stored, and these covariance matrices are used to calculate filter coefficients. These filter coefficients are used to filter the signals acquired by the microphones, thereby controlling the signals from the respective speech sound sources to have a constant volume. In this embodiment, let it be assumed that the output signals from the microphones $11_1$ to $11_M$ are digital signals into which the signals acquired by the microphones are converted by a digital-to-analog converter at a predetermined sampling frequency, though not shown in particular. This applies to other embodiments of the present invention.

Figure 2:
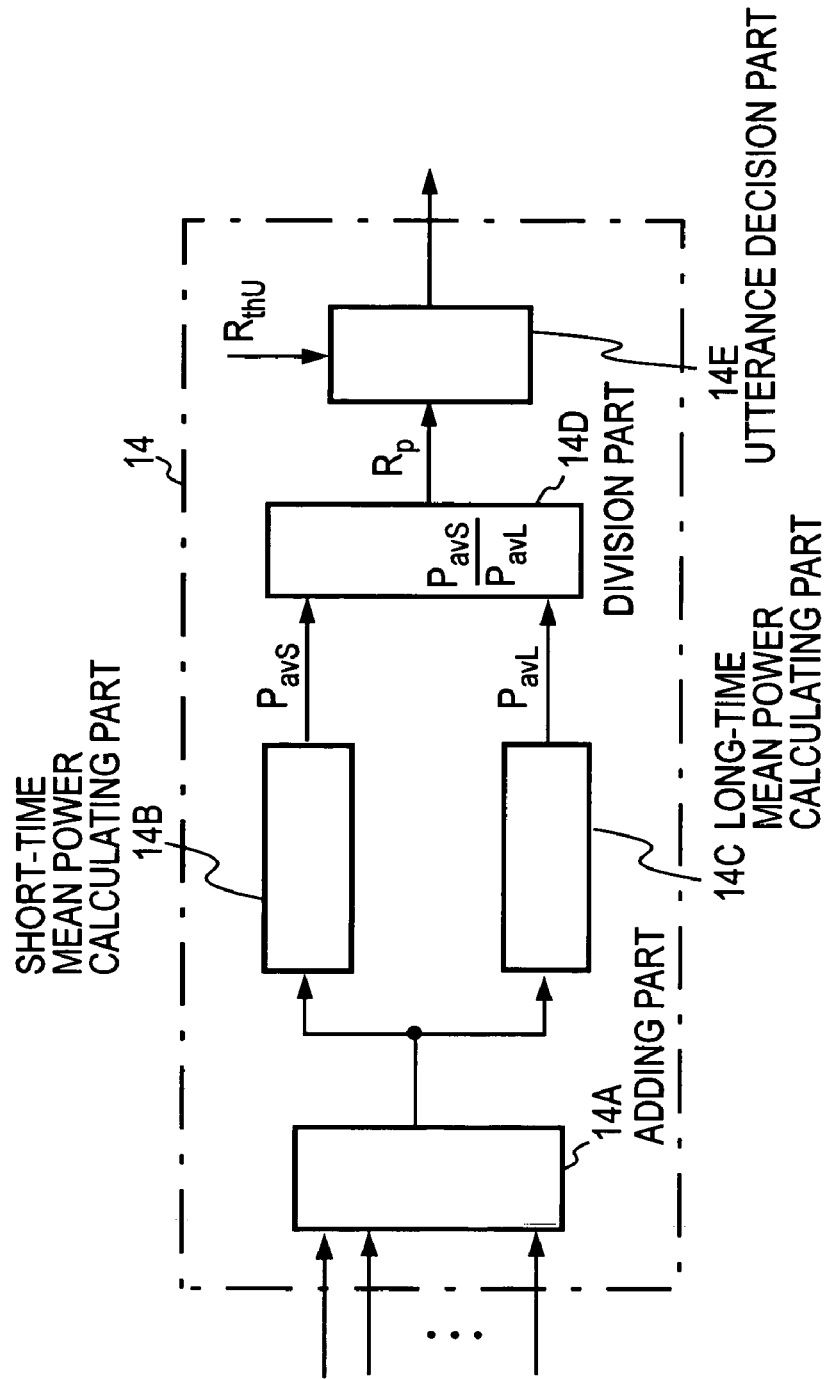
FIG. 2 is a block diagram showing an example of the configuration of a state decision part 14 in FIG. 1.

In the first place, the state decision part 14 detects an utterance period from each of the received signals by the microphones $11_1$ to $11_M$. For example, as shown in FIG. 2, in the state decision part 14 all the received signals from the microphones $11_1$ to $11_M$ are added together by an adding part 14A, then the added output is applied to a short-time mean power calculating part 14B and a long-time mean power calculating part 14C to obtain a shirt-time mean power (approximately in the range of 0.1 to 1 s, for instance) $P_{avS}$ and a long-time mean power (approximately in the range of 1 to 100 s, for instance) $P_{avL}$, respectively, then the ratio between the short-time mean power and the long-time mean power, $R_p = P_{avS}/P_{avL}$, is calculated in a division part 14D, and in an utterance decision part 14E the power ratio $R_p$ is compared with a predetermined utterance threshold value $R_{thU}$; if the power ratio exceeds the threshold value, then the former is decided as indicating the utterance period.

When the decision result by the state decision part 14 is the utterance period, the sound source position detecting part 15 estimates the position of the sound source. A method for estimating the sound source position is, for example, a cross-correlation method.

Let M (M being an integer equal to or greater than 2) represent the number of microphones and $\tau_{ij}$ represent a measured value of the delay time difference between signals acquired by i-th and j-th microphones $11_i$ and $11_j$. The measured value of the delay time difference between the acquired signals can be obtained by calculating the cross-correlation between the acquired signals and detecting its maximum peak position. Next, let the sound acquisition position of an m-th (where m=1, . . . , M) microphone be represented by (xm, ym, zm) and an estimated sound source position by $(\hat{X}, \hat{Y}, \hat{Z})$. An estimated value $\hat{\tau}_{ij}$ of the delay time difference between the acquired signals, which is available from these positions, is expressed by Eq. (2).

$$\hat{\tau}_{ij} = \frac{1}{c}\sqrt{(x_i - \hat{X})^2 + (y_i - \hat{Y})^2 + (z_i - \hat{Z})^2} - \frac{1}{c}\sqrt{(x_j - \hat{X})^2 + (y_j - \hat{Y})^2 + (z_j - \hat{Z})^2} \quad (2)$$

where c is sound velocity.

Next, measured and estimated value $\tau_{ij}$ and $\hat{\tau}_{ij}$ of the delay time difference between the acquired signals are multiplied by the sound velocity c for conversion into distance values, which are used as measured and estimated values $d_{ij}$ and $\hat{d}_{ij}$ of the difference in the distance to the uttering sound source between the positions of microphones acquiring the speech sound therefrom, respectively; a mean square error e(q) of these values is given by Eq. (3).

$$e(q) = \sum_{i=1}^{M-1} \sum_{j=i+1}^{M} |d_{ij} - \hat{d}_{ij}|^2 \quad (3)$$

$$= \sum_{i=1}^{M-1} \sum_{j=i+1}^{M} \left| d_{ij} - \sqrt{(x_i - \hat{X})^2 + (y_i - \hat{Y})^2 + (z_i - \hat{Z})^2} + \sqrt{(x_j - \hat{X})^2 + (y_j - \hat{Y})^2 + (z_j - \hat{Z})^2} \right|^2$$

$$= \sum_{i=1}^{M-1} \sum_{j=i+1}^{M} |d_{ij} - r_i + r_j|^2.$$

where $q = (\hat{X}, \hat{Y}, \hat{Z})$. $r_i$ and $r_j$ represent the distances between the estimated sound source position $q = (\hat{X}, \hat{Y}, \hat{Z})$ and the microphones $11_i$ and $11_j$.

By obtaining a solution that minimizes the mean square error e(q) of Eq. (3), it is possible to obtain estimated sound source position that minimizes the error between the measured and estimated values of the delay time difference between the acquired signals. In this instance, however, since Eq. (3) is nonlinear simultaneous equations and is difficult to solve analytically, the estimated sound source position is obtained by a numerical analysis using successive correction.

To obtain the estimated sound source position $(\hat{X}, \hat{Y}, \hat{Z})$ that minimizes Eq. (3), the gradient at a certain point in Eq. (3) is calculated, then the estimated sound source position is corrected in the direction in which to reduce the error until the gradient becomes zero; accordingly, the estimated sound source position is corrected by repeatedly calculating the following equation (4) for u=0, 1, . . . .

$$q_{(u+1)} = q_{(u)} - \alpha \cdot \text{grad } e(q)|_{q=q_{(u)}} \quad (4)$$

where $\alpha$ is a step size of correction, and it is set at a value $\alpha>0$. $q_{(u)}$ represents q corrected u times, and $q_{(0)} = (\hat{X}_0, \hat{Y}_0, \hat{Z}_0)$ is a predetermined arbitrary initial value when u=0. grad represents the gradient, which is expressed by the following equations (5) to (10).

$$\text{grad } e(q) = \left(\frac{\partial e(q)}{\partial \hat{X}}, \frac{\partial e(q)}{\partial \hat{Y}}, \frac{\partial e(q)}{\partial \hat{Z}}\right) \quad (5)$$

$$\frac{\partial e(q)}{\partial \hat{X}} = 2\sum_{i=1}^{M-1} \sum_{j=i+1}^{M} \{d_{ij} - r_i + r_j\} \cdot \left\{\frac{x_i - \hat{X}}{r_i} - \frac{x_j - \hat{X}}{r_j}\right\} \quad (6)$$

$$\frac{\partial e(q)}{\partial \hat{Y}} = 2\sum_{i=1}^{M-1} \sum_{j=i+1}^{M} \{d_{ij} - r_i + r_j\} \cdot \left\{\frac{y_i - \hat{Y}}{r_i} - \frac{y_j - \hat{Y}}{r_j}\right\} \quad (7)$$

$$\frac{\partial e(q)}{\partial \hat{Z}} = 2\sum_{i=1}^{M-1} \sum_{j=i+1}^{M} \{d_{ij} - r_i + r_j\} \cdot \left\{\frac{z_i - \hat{Z}}{r_i} - \frac{z_j - \hat{Z}}{r_j}\right\} \quad (8)$$

$$r_i = \sqrt{(x_i - \hat{X})^2 + (y_i - \hat{Y})^2 + (z_i - \hat{Z})^2} \quad (9)$$

$$r_j = \sqrt{(x_j - \hat{X})^2 + (y_j - \hat{Y})^2 + (z_j - \hat{Z})^2} \quad (10)$$

As described above, by repeatedly calculating Eq. (4), it is possible to obtain the estimated sound source position $q=(\hat{X}, \hat{Y}, \hat{Z})$ where the error is minimized.

Figure 3:
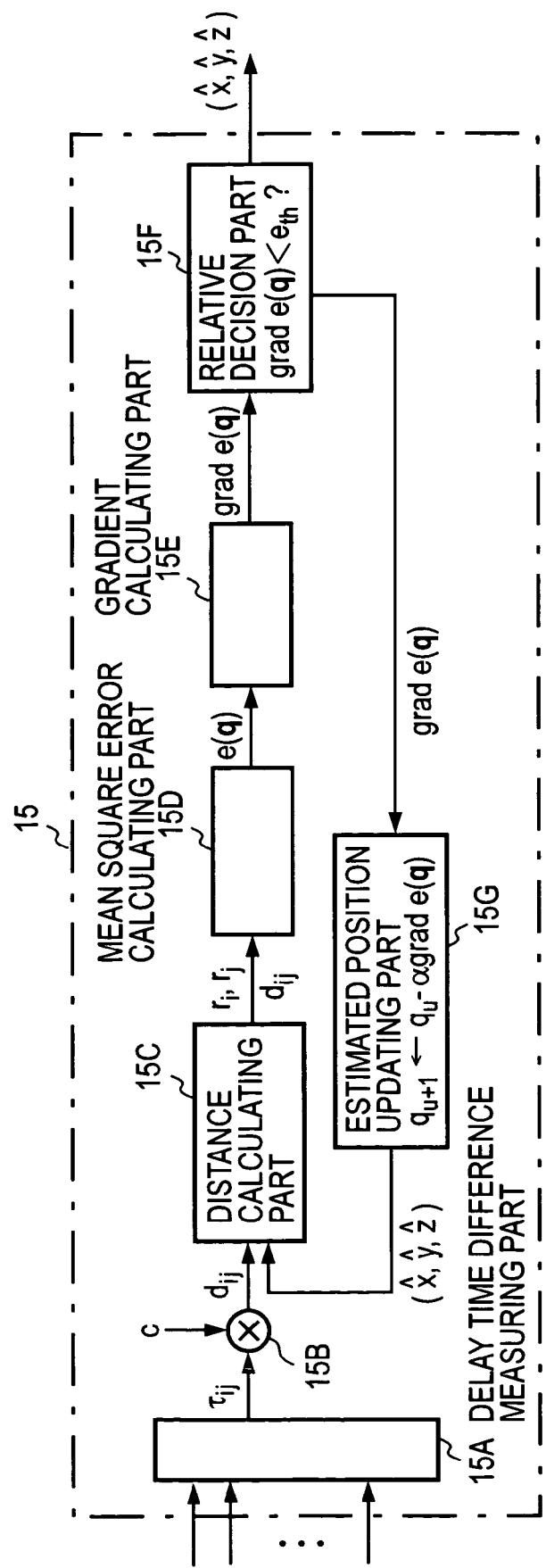
FIG. 3 is a block diagram showing an example of the configuration of a sound source position detecting part 15 in FIG. 1.

FIG. 3 illustrates in block form the functional configuration of the sound source position detecting part 15. In this example, the sound source position detecting part is comprises a delay time difference measuring part 15A, a multiplier 15B, a distance calculating part 15C, a mean square error calculating part 15D, a gradient calculating part 15E, a relative decision part 15F, and an estimated position updating part 15G. The delay time difference measuring part 15A measures, during utterance from one speech sound source $9_k$, the delay time difference $\tau_{ij}$ by the cross-correlation scheme for every pair (i, j) of i=1, 2, ..., M−1;

j=i+1, i+2, ..., M based on the received signals by the microphones $11_i$ and $11_j$. The multiplier 15B multiplies each measured delay time difference $\tau_{ij}$ by the sound velocity c to obtain the difference in distance, $d_{ij}$, between the sound source and the microphones $11_i$ and $11_j$. The distance calculating part 15C calculates, by Eqs. (9) and (10), the distances $r_i$ and $r_j$ between the estimated sound source position $(\hat{X}, \hat{Y}, \hat{Z})$ fed from the estimated position updating part 15G and the microphones $11_i$ and $11_j$. In this case, however, the estimated position updating part 15G provides an arbitrary initial value $(\hat{X}_0, \hat{Y}_0, \hat{Z}_0)$ as a first estimated sound source position to the distance calculating part 15C. The mean square error calculating part 15D uses $d_{ij}$, $r_i$ and $r_j$ to calculate the mean square error e(q) by Eq. (3) for all of the above-mentioned pairs (i, j). The gradient calculating part 15F uses the current estimate sound source position and $d_{ij}$, $r_i$, $r_j$ to calculate the gradient grad e(q) of the mean square error e(q) by Eqs. (6), (7) and (8).

The relative decision part 15F compares each element of the gradient grad e(q) of the mean square error with a predetermined threshold value $e_{th}$ to decide whether every element is smaller than the threshold value $e_{th}$, and if so, then outputs the estimated sound source position $(\hat{X}, \hat{Y}, \hat{Z})$ at that time. If every element is not smaller than $e_{th}$, then the estimated position updating part 15G uses the gradient grad e(q) and the current estimated position $q=(\hat{X}, \hat{Y}, \hat{Z})$ to update the estimated position by Eq. (4), and provides th updated estimated position $q_{u+1}=(\hat{X}, \hat{Y}, \hat{Z})$ to the distance calculating part 15C. The distance calculating part 15C uses the updated estimated position $(\hat{X}, \hat{Y}, \hat{Z})$ and $d_{ij}$ to calculate $r_i$ and $r_j$ updated in the same manner as referred to previously; thereafter, the mean square error calculating part 15D updates e(q), then the gradient calculating part 15E calculates the updated grad e(q), and the relative decision part 15F decides whether the updated mean square error e(q) is smaller than the threshold value $e_{th}$.

In this way, updating of the estimated position $(\hat{X}, \hat{Y}, \hat{Z})$ is repeated until every element of the gradient grad e(q) of the mean square error becomes sufficiently small (smaller than $e_{th}$), thereby estimating the position $(\hat{X}, \hat{Y}, \hat{Z})$ of the sound source $9_k$. Similarly, positions of other sound sources are estimated.

The frequency domain converting part 16 converts the signal acquired by each microphone to a frequency domain signal. For example, the sampling frequency of the acquired signal is 16 kHz, and acquired signal samples from each microphone $11_m$ (m=1, . . . , M) are subjected to FFT (Fast Fourier Transform) processing every frame of 256 samples to obtain the same number of frequency domain signal samples $X_m(\omega)$.

Next, the covariance matrix calculating part 17 calculates the covariance of the microphone acquired signals and generates a covariance matrix. Letting $X_1(\omega)$ to $X_M(\omega)$ represent the frequency domain converted signals of the microphone acquired signals obtained by the frequency domain converting part 16 for each sound source $9_k$, an M×M covariance matrix $R_{XX}(\omega)$ of these signals is generally expressed by the following equation (11).

$$R_{XX}(\omega) = \begin{pmatrix} X_1(\omega) \\ \vdots \\ X_M(\omega) \end{pmatrix} (X_1(\omega)^*, \cdots, X_M(\omega)^*) \quad (11)$$

$$= \begin{pmatrix} X_1(\omega)X_1(\omega)^*, & X_1(\omega)X_2(\omega)^*, & \cdots, & X_1(\omega)X_M(\omega)^* \\ X_2(\omega)X_1(\omega)^*, & X_2(\omega)X_2(\omega)^*, & \cdots, & X_2(\omega)X_M(\omega)^* \\ \vdots & \vdots & \ddots & \vdots \\ X_M(\omega)X_1(\omega)^*, & X_M(\omega)X_2(\omega)^*, & \cdots, & X_M(\omega)X_M(\omega)^* \end{pmatrix}$$

where * represents a complex conjugate.

Next, the covariance matrix storage part 18 stores, based on the result of detection by the sound source position detecting part 15, the covariance matrix $R_{XX}(\omega)$ as an M×M covariance matrix $R_{SkSk}(\omega)$ for each sound source $9_k$.

Letting $A_k(\omega)=(a_{k1}(\omega), \ldots, a_{kM}(\omega))$ represent the weighted mixing vectors for M-channel acquired signals for each sound source $9_k$, the acquired sound level estimating part 19 calculates the acquired sound level $_{Sk}$ for each sound source by the following equation (12) using the covariance matrix $R_{SkSk}(\omega)$ of the acquired signal for each sound source $9_k$ stored in the covariance matrix storage part 18.

$$P_{Sk} = \frac{1}{W} \sum_{\omega=0}^{W} A_k(\omega)^H R_{SkSk}(\omega) A_k(\omega) \quad (12)$$

In the above, the weighted mixing vector is expressed as a vector $A_k(\omega)=(a_{k1}(\omega), \ldots, a_{kM}(\omega))$ that has a controllable frequency characteristics, but if no frequency characteristics control is effected, the elements of the vector $A_k$ may be preset values $a_{k1}, a_{k2}, \ldots, a_{kM}$. For example, the elements of the weighted mixing vector $A_k$ for each sound source $9_k$ are given greater values as the microphones corresponding to the elements become closer to the sound source $9_k$. In the extreme, it is possible to set 1 for only the element corresponding to the microphone $11_m$ closest to the sound source $9_k$ and set 0 for all the other elements like $A_k=(0, \ldots 0, a_{km}=1, 0, \ldots, 0)$. In the following description, $a_{k1}(\omega), \ldots, a_{kM}(\omega)$ will be expressed simply as $a_{k1}, \ldots, a_{kM}$, for the sake of brevity.

$^H$ in Eq. (12) represents a complex conjugate transpose, and $A_k(\omega)^H R_{SkSk}(\omega) A_k(\omega)$ can be expanded as given by the following equation.

$$A_k(\omega)^H R_{SkSk}(\omega) A_k(\omega) = \quad (13)$$

$$a_{k1}^*(a_{k1}X_1(\omega)X_1(\omega)^* + a_{k2}X_2(\omega)X_1(\omega)^* + \ldots + a_{kM}X_M(\omega)X_1(\omega)^*) +$$

-continued $$a_{k2}^*(a_{k1}X_1(\omega)X_2(\omega)^* + a_{k2}X_2(\omega)X_2(\omega)^* + \ldots + a_{kM}X_M(\omega)X_2(\omega)^*) +$$
$$\vdots \qquad \vdots$$
$$a_{kM}^*(a_{k1}X_1(\omega)X_M(\omega)^* + a_{k2}X_2(\omega)X_M(\omega)^* + \ldots + a_{kM}X_M(\omega)X_M(\omega)^*) =$$
$$\Omega(\omega)$$

Eq. (12) means that the mean power $P_{sk}$ of the acquired signal is calculated by adding the power spectrum sample value represented by $\Omega(\omega)$ given by Eq. (13) for bands 0 to W (sample number) of the frequency domain signal generated by the frequency domain converting part 16 and then dividing the added value by W.

For example, assuming that the microphone 11$_1$ is the closest to the sound source 9$_1$, the value of the weighting factor $a_{k1}$ is so determined as to assign the maximum weight to the acquired signal by the microphone 11$_1$ (a first channel) and the values of weighting factors $a_{k2}$, $a_{k3}$, . . . , $a_{kM}$ for the acquired signals of the other channels are determined smaller than $a_{k1}$. With such weighting scheme, it is possible to increase S/N (Signal to Noise ratio) of the acquired signal from the sound source 9$_1$ or lessen the influence of room reverberation more than in the case where such weighting is not performed. That is, the optimum value of the weighting factor of the weighted mixing vector $A_k(\omega)$ for each sound source 9$_k$ is predetermined experimentally by the directivity and layout of microphones and the layout of sound sources in such a manner as to increase S/N of the output speech signal corresponding to the sound source 9$_k$, for example, and decrease the room reverberation. According to the present invention, however, even when equal weighting is done in all the channels, acquired signals from the respective sound sources can be controlled to a desired level.

Next, the filter coefficient calculating part 21 calculates filter coefficients for acquiring speech sound from each sound source in a desired volume. In the first place, let $H_1(\omega)$ to $H_M(\omega)$ represent frequency domain converted versions of filter coefficients of the filters 12$_1$ to 12$_M$ each connected to one of the microphones. Next, let $H(\omega)$ represent a matrix of these filter coefficients by the following equation (14).

$$H(\omega) = \begin{pmatrix} H_1(\omega) \\ \vdots \\ H_M(\omega) \end{pmatrix} \qquad (14)$$

Further, let $X_{Sk,1}$ to $X_{Sk,M}$ represent frequency domain converted signals of the signals acquired by respective microphones during utterance of the k-th sound source 9$_k$.

In this case, the condition that the filter coefficient matrix $H(\omega)$ needs to satisfy is that when the microphone acquired signals are subjected to filtering with the filter coefficient matrix $H(\omega)$ and the filtered signals are added together, the signal component from each sound source has a desired level $P_{opt}$. Accordingly, the following equation (15) is an ideal condition by which the signal obtained by adding the filtered signals from the sound source 9$_k$ becomes equivalent to a signal obtained by multiplying the weighted mixing vector $A_k(\omega))$ for the acquired signals from the microphones 11$_1$ to 11$_M$ by a desired gain.

$$(X_{Sk,1}(\omega), \cdots, X_{Sk,M}(\omega))H(\omega) = \qquad (15)$$
$$\sqrt{\frac{P_{opt}}{P_{Sk}}}(X_{Sk,1}(\omega), \cdots, X_{Sk,M}(\omega))A_k(\omega)$$

where k=1, . . . , K, K representing the number of sound sources.

Next, solving the condition of Eq. (15) by the least square method for the filter coefficient matrix $H(\omega)$ gives the following equation (16).

$$H(\omega) = \left\{\sum_{k=1}^{K} C_{Sk}R_{SkSk}(\omega)\right\}^{-1} \sum_{k=1}^{K} C_{Sk}\sqrt{\frac{P_{opt}}{P_{Sk}}}R_{SkSk}(\omega)A_k(\omega) \qquad (16)$$

where $C_{Sk}$ is a weighting factor that imposes a sensitivity restraint on the k-th sound source position. The sensitivity restraint mentioned herein means flattening the frequency characteristics of the present sound acquisition apparatus with respect to the sound source position. An increase in this value increases the sensitivity restraint on the sound source concerned, permitting sound acquisition with flatter frequency characteristics but increasing deterioration of frequency characteristics for other sound source positions. Hence, it is preferable that $C_{Sk}$ be normally set at a value approximately in the range of 0.1 to 10 to impose well-balances restraints on all the sound sources.

Figure 4:
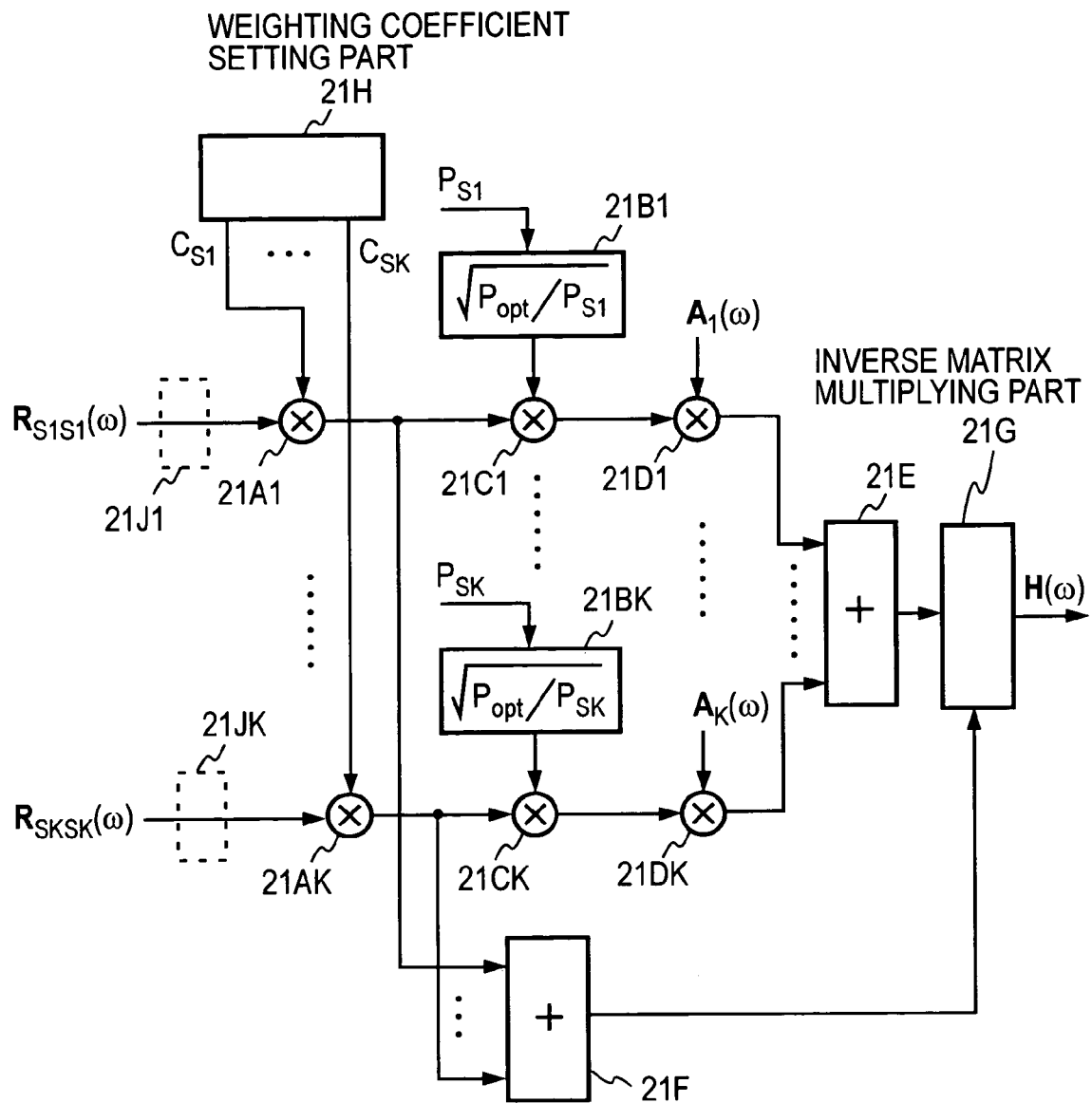
FIG. 4 is a block diagram showing an example of the configuration of a filter coefficient calculating part 21 in FIG. 1.

FIG. 4 illustrates in block form the functional configuration of the filter coefficient calculating part 21 for calculating the filter coefficients expressed by Eq. (16). In this example, the covariance matrices $R_{S1S1}$ to $R_{SKSK}$ corresponding to the respective sound sources 9$_1$ to 9$_K$, provided from the covariance matrix storage part 18, are applied to multipliers 21A1 to 21Ak, wherein they are multiplied by weighting factors $C_{S1}$ to $C_{SK}$ set by a weighting factor setting part 21H, respectively. The acquired sound levels $P_{S1}$ to $P_{SK}$ for the sound sources 9$_1$ to 9$_K$, estimated by the acquired sound level estimating part 19, are provided to square ratio calculating parts 21B1 to 21BK, wherein square ratios, $(P_{opt}/P_{S1})^{1/2}$ to $(P_{opt}/P_{SK})^{1/2}$, between them and the predetermined desired output level $P_{opt}$ are calculated, and the calculated values are provided to multipliers 21C1 to 21CK for multiplication by the outputs from multipliers 21A1 to 21AK, respectively. The outputs from the multipliers 21C1 to 21CK are fed to multipliers 21D1 to 21DK, where they are further multiplied by weighted mixing vectors $A_1(\omega)$ to $A_K(\omega)$, and a matrix of the total sum of the multiplied outputs is calculated by an adder 21E. On the other hand, a matrix of the sum total of the outputs from the multipliers 21A1 to 21AK is calculated by an adder 21F, and by an inverse matrix multiplier 21G, an inverse matrix of the matrix calculated by the adder 21F and the output from the adder 21E are multiplied to calculate the filter coefficient $H(\omega)$.

Next, the filter coefficients $H_1(\omega)$, $H_2(\omega)$, . . . , $H_M(\omega)$ calculated by the filter coefficient calculating part 21 are set in the filters 12$_1$ to 12$_M$ for filtering the acquired signals from the microphones 11$_1$ to 11$_M$, respectively. The filtered signals are added together by the adder 13, from which the added output is provided as an output signal.

A description will be given below of three examples of the usage of the sound acquisition apparatus according to the present invention.

Figure 5:
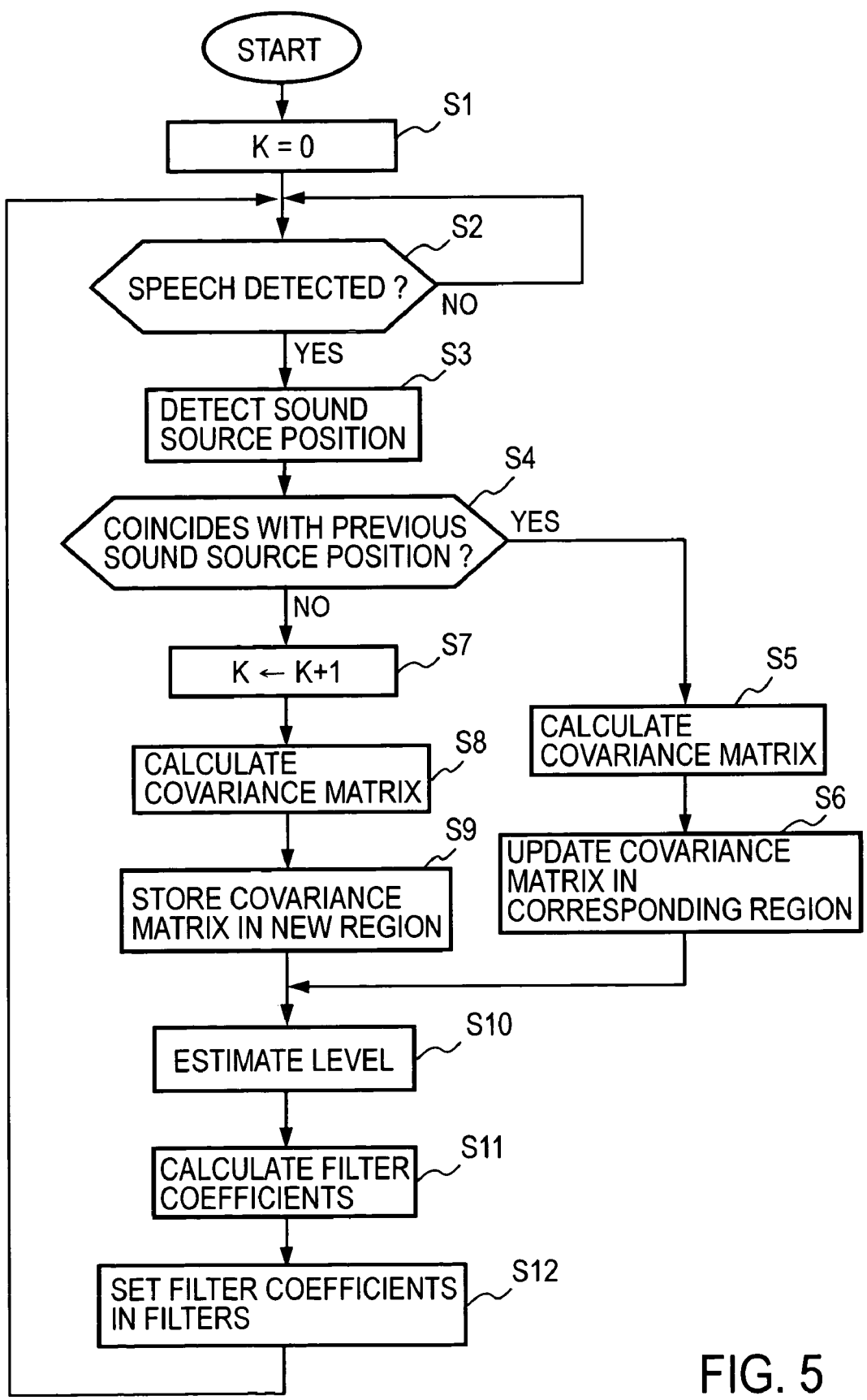
FIG. 5 is a flowchart showing a first example of a sound acquisition method using the sound acquisition apparatus of FIG. 1.

A first method begins, as shown in FIG. 5, with initial setting of the number K of sound sources at K=0 in step S1. This is followed by step S2 in which the state decision part 14 periodically makes a check for utterance, and if utterance is detected, the sound source position detecting part 15 detects the position of the sound source concerned in step S3. In step S4 it is decided whether the detected sound source position matches any one of those previously detected, and if a match is found, the covariance matrix $R_{XX}(\omega)$ corresponding to that sound source position is newly calculated in the covariance matrix calculating part 17 in step S5, and in step S6 the covariance matrix in the corresponding area of the covariance matrix storage part 18 is updated with the newly calculated covariance matrix.

When no match is found with the previously detected sound source position in step S4, K is incremented by 1 in step S7, then in step S8 the covariance matrix $R_{XX}(\omega)$ corresponding to that sound source position is newly calculated in the covariance matrix calculating part 17, and in step S9 the covariance matrix is stored in a new area of the covariance matrix storage part 18.

Next, in step S10 the acquired sound level is estimated from the stored covariance matrix in the acquired sound level estimating part 19, then in step S11 the estimated acquired sound level and the covariance matrix are used to calculate the filter coefficients $H_1(\omega)$ to $H_M(\omega)$ by the filter coefficient calculating part 17, and in step S12 the filter coefficients set in the filters $12_1$ to $12_M$ are updated with the newly calculated ones.

Figure 6:
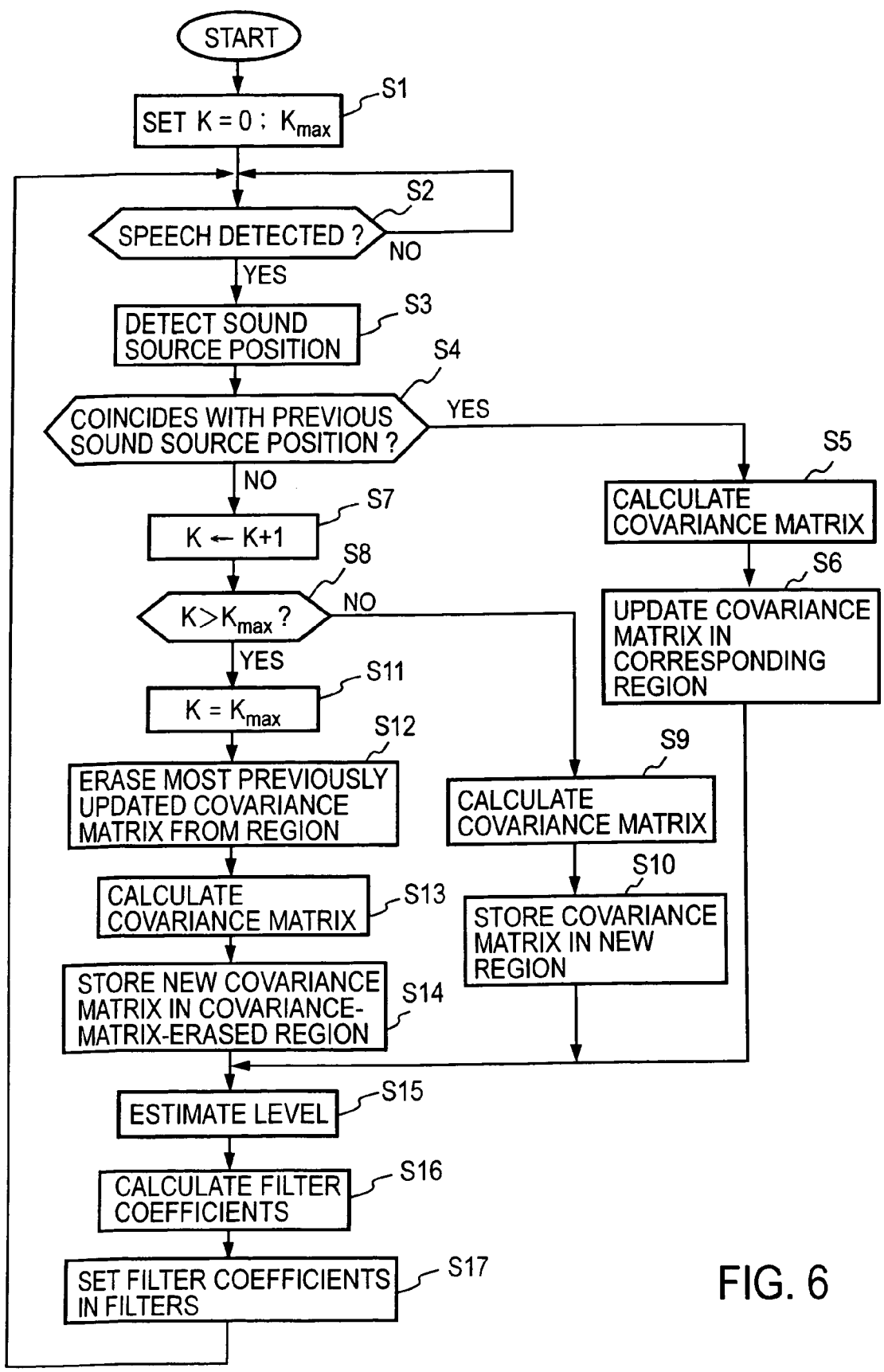
FIG. 6 is a flowchart showing a second example of a sound acquisition method using the sound acquisition apparatus of FIG. 1.

A second method begins, as shown in FIG. 6, with presetting the maximum value of the sound source number at $K_{max}$ and presetting the initial value of the sound source number K at 0 in step S1. The subsequent steps S2 to S6 are the same as in the case with FIG. 5; that is, the microphone output signals are checked for utterance, and if utterance is detected, then its sound source position is detected, then it is decided whether the detected sound source position matches any one of those previously detected, and if a match is found, the covariance matrix corresponding to that sound source position is calculated and stored as a newly updated matrix in the corresponding storage area.

When it is found in step S4 that the detected sound source position does not match any one of previously detected positions, K is incremented by 1 in step S7, and in step S8 a check is made to see if K is larger than the maximum value $K_{max}$. If it does not exceed the maximum value $K_{max}$, then the covariance matrix for the detected position is calculated in step S9, and in step S10 the covariance matrix is stored in a new area. When it is found that in step S8 that K exceeds the maximum value $K_{max}$, $K=K_{max}$ is set in step S11, then in step S12 the most previously updated one of the covariance matrices stored in the covariance matrix storage part 18 is erased, and a new covariance matrix calculated by the covariance matrix calculating part 17 in step S13 is stored in that area in step S14. The subsequent steps S15, S16 and S17 are the same as in steps S10, S11 and S12 in FIG. 5; that is, the estimated acquired sound level for each sound source is calculated from the covariance matrix, and filter coefficients are calculated and set in the filters $12_1$ to $12_M$. This method is advantageous over the FIG. 5 method in that the storage area of the covariance matrix storage part 18 can be reduced by limiting the maximum value of the sound source number K to $K_{max}$.

Figure 7:
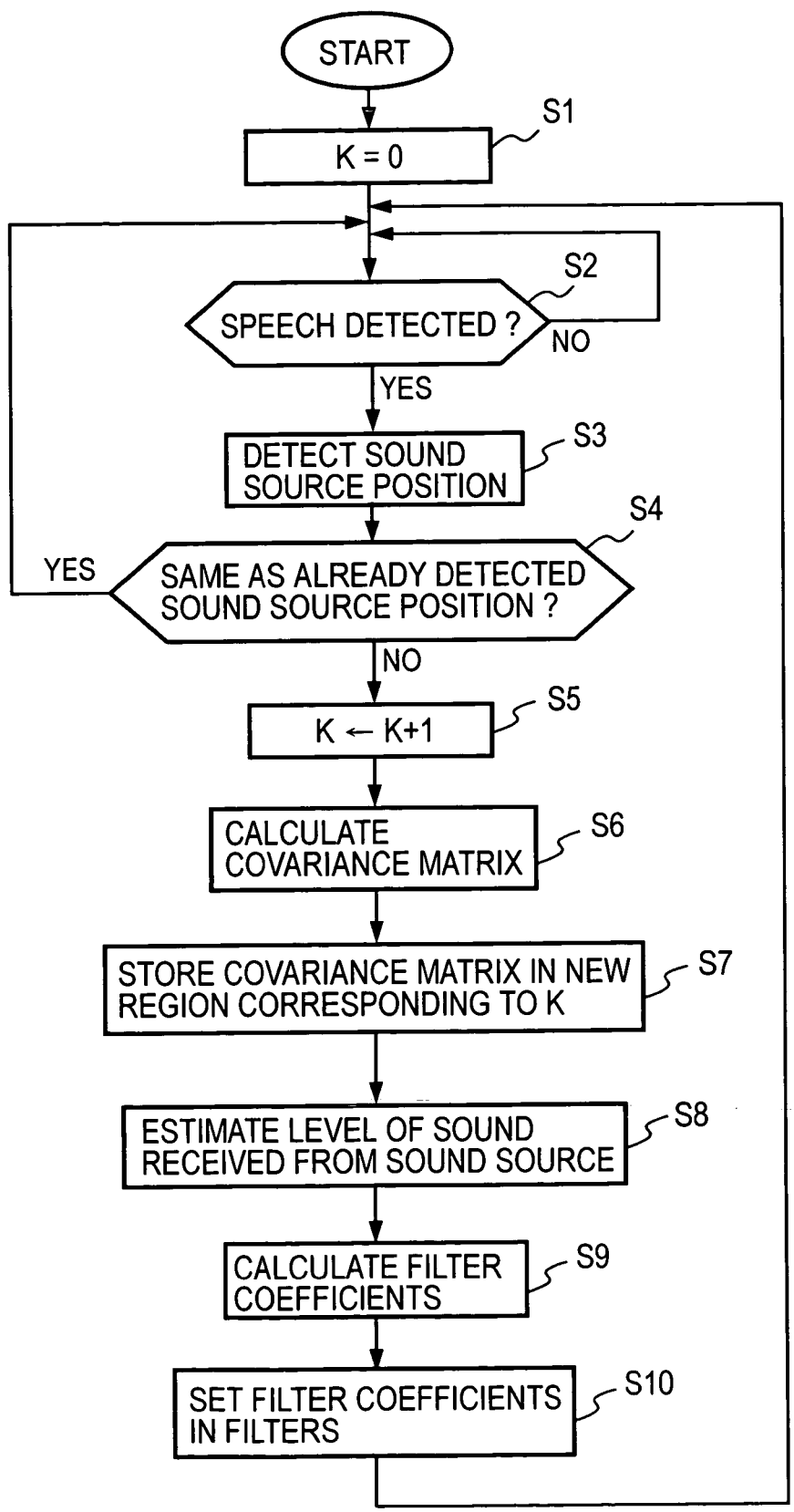
FIG. 7 is a flowchart showing a third example of a sound acquisition method using the sound acquisition apparatus of FIG. 1.

In the first and second methods, described above, each detection of speech sound is always accompanied by the calculation and storage of a covariance matrix and updating of the filter coefficients, but the third method described below does not involve updating of the filter coefficients when the position of the sound source of the detected utterance matches any one of the already detected sound source positions. FIG. 7 illustrates the procedure of the third method. In step S1 the initial value of the sound source number k is set to 0, then in step S2 the state detecting part 14 periodically makes a check for utterance, and if utterance is detected, the sound source position detecting part 15 detects the position of the sound source of the detected utterance in step S3. In step S4 it is decided whether the detected sound source position matches any one of the already detected sound source positions, and if a match is found, the procedure returns to step S2 without updating. If no match is found with any one of the already detected sound source positions in step S4, that is, if the sound source $9_k$ moves to a position different from that where it was previously, or if a new sound source is added, K is incremented by 1 in step S5, then in step S6 the covariance matrix $R_{SkSk}(\omega)$ corresponding to the sound source is newly calculated in the covariance calculating part 17, and in step S7 it is stored in the corresponding new area $MA_k$ of the covariance storage part 18, then in step S8 the covariance matrix is used to estimate the acquired sound level by the acquired sound level estimating part 19, then in step S9 all the covariance matrices and estimated acquired sound levels to calculate updated filter coefficients by the filter coefficient calculating part 21, and in step S10 the updated filter coefficients are set in the filters $12_1$ to $12_M$, followed by a return to step S2.

As described above, according to the present invention, the sound source positions are estimated from the acquired signals of a plurality of microphones, then a covariance matrix of the acquired signal is calculated for each sound source, then filter coefficients for adjusting the sound volume for each sound source position are calculated, and the filter coefficients are used to filter the acquired signals of the microphones, by which it is possible to obtain an output signal of a volume adjusted for each speaker's position.

While the FIG. 1 embodiment has been described with reference to the case where the sound source position detecting part 15 estimates the coordinate position of each sound source $9_k$, it is also possible to calculate the sound source direction, that is, the angular position of each sound source $9_k$ to the arrangement of the microphones $11_1$ to $11_M$. A method for estimating the sound source direction is set forth, for example, in Tanaka, Kaneda, and Kojima, "Performance Evaluation of a Sound Source Direction Estimating Method under Room Reverberation," Journal of the Society of Acoustic Engineers of Japan, Vol. 50, No. 7, 1994, pp. 540-548. In short, a covariance matrix of acquired signals needs only to be calculated for each sound source and stored.

Second Embodiment

Figure 8:
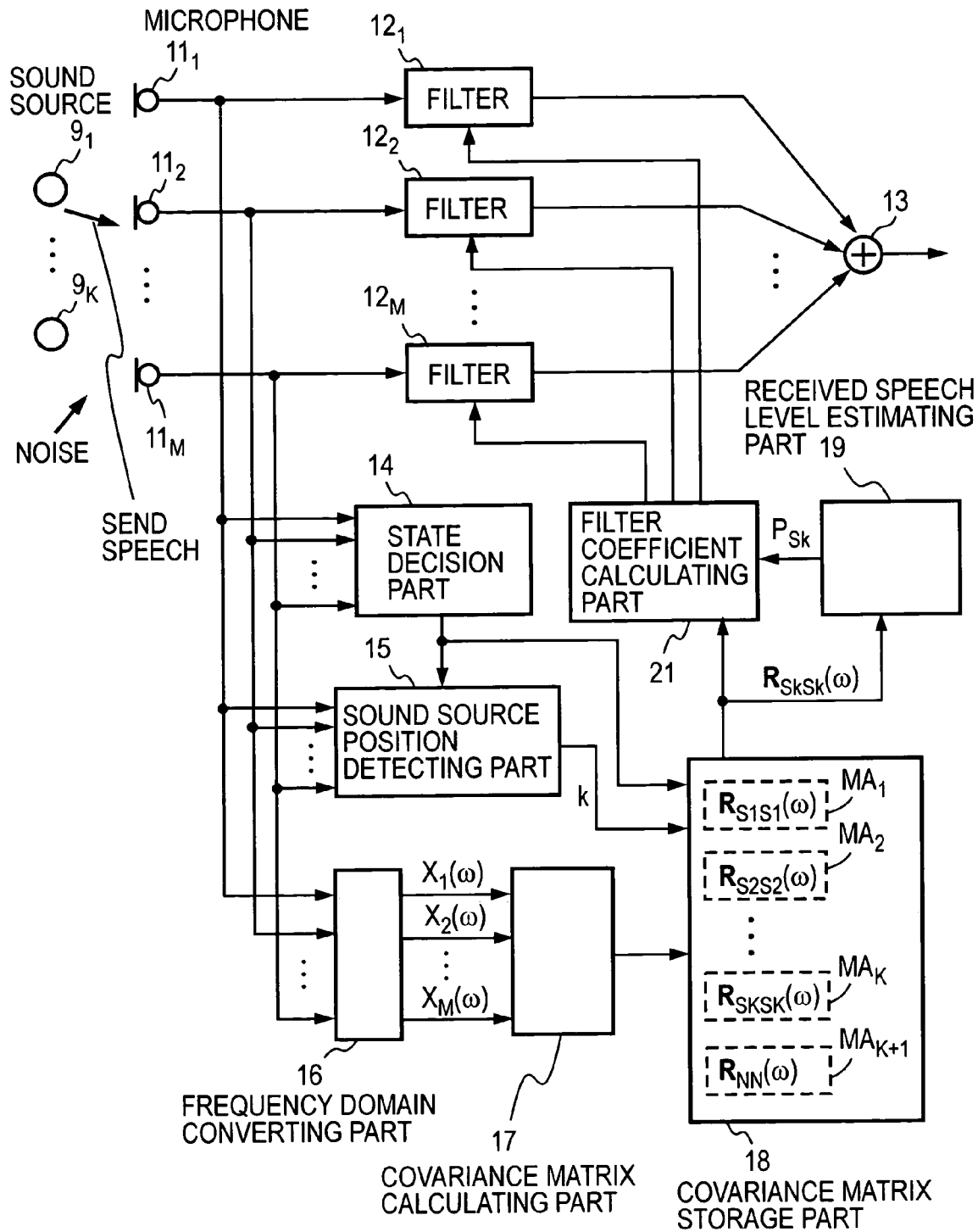
FIG. 8 is a block diagram illustrating a sound acquisition apparatus according to a second embodiment of the present invention.

FIG. 8 is a functional block diagram of a sound acquisition apparatus according to a second embodiment of the present invention.

The sound acquisition apparatus of this embodiment comprises microphones $11_1$ to $11_M$, filters $12_1$ to $12_M$, an adder 13, a state decision part 14, a sound source position detecting part 15, a frequency domain converting part 16, a covariance matrix calculating part 17, a covariance matrix storage part 18, an acquired sound level estimating part 19, and a filter coefficient calculating part 21.

This embodiment adds an effect of noise reduction to the acquired sound level adjustment of the sound acquisition apparatus according to the first embodiment of the present invention.

Figure 9:
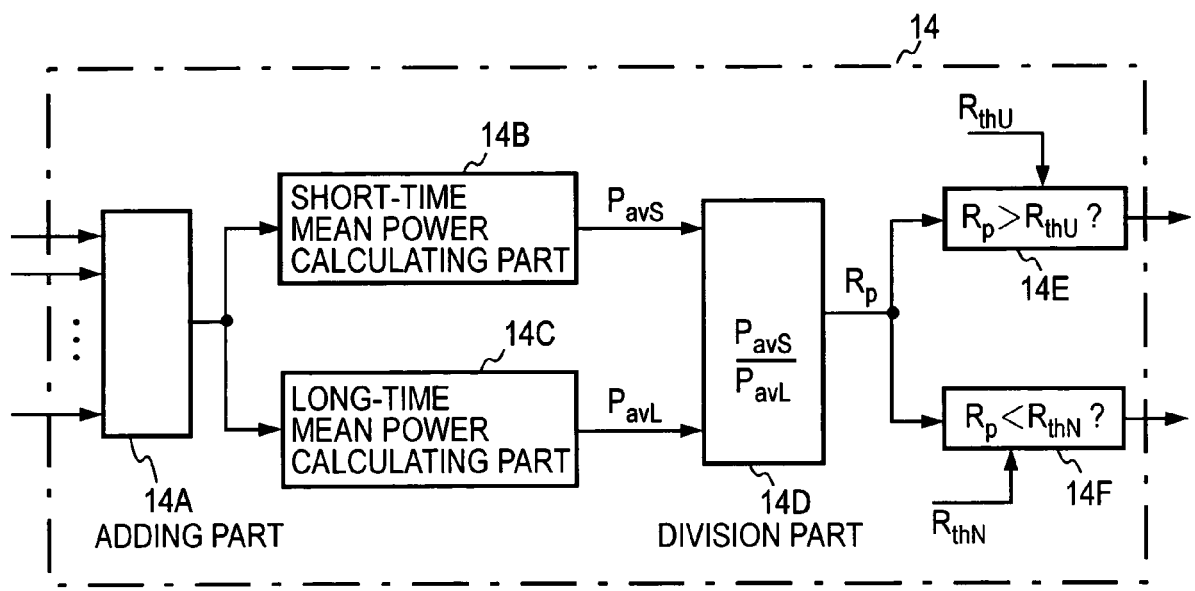
FIG. 9 is a block diagram showing an example of the configuration of the state decision part 14 in FIG. 8.

In the first place, the state decision part 14 detects an utterance period and a noise period from the power of the received signals from the microphones $11_1$ to $11_M$. The state decision part 14 includes, as shown in FIG. 9, a noise decision part 14F added to the state decision part 14 of FIG. 2. For example, as is the case with the first embodiment, a short-time mean power $P_{avS}$ and a long-time mean power $P_{avL}$ are calculated by the short-time mean power calculating part 14B and the long-time mean power calculating part 14C for the acquired signals from the respective microphones, then the ratio, $R_p = P_{avS}/P_{avL}$, between the short-time mean power and the long-time mean power is calculated in the division part 14D, then the ratio is compared with an utterance threshold value $P_{thU}$ in the utterance decision part 14E, and if the power ratio exceeds the threshold value, it is decided as indicating the presence of the utterance period. The noise decision part 14F compares the power ratio $R_p$ with a noise threshold value $P_{thN}$, and if the power ratio is smaller than the threshold value, it is decided as indicating the presence of the noise period.

When the result of decision by the utterance decision part 14E is indicative of the utterance period, the sound source position detecting part 15 detects the position of the sound source concerned in the same way as in the first embodiment of the present invention.

Next, the frequency domain converting part 16 converts acquired signals from the microphones $11_1$ o $11_M$ in the utterance period and in the noise period of each sound source $9_k$ into frequency domain signals, and provides them to the covariance matrix calculating part 17. The covariance matrix calculating part 17 calculates a covariance matrix $R_{SkSk}(\omega)$ of the frequency domain acquired signals for the sound source $9_k$ in the same manner as in the first embodiment of the present invention. Further, the covariance matrix calculating part calculates a covariance matrix $R_{NN}(\omega)$ of the frequency domain acquired signals in the noise period.

The covariance matrix storage part 18 stores, based on the result of detection by the sound source position detecting part 15 and the result of decision by the state decision part 14, the covariance matrices $R_{SkSk}(\omega)$ in the utterance period and the covariance matrices $R_{NN}(\omega)$ in the noise period for the sound sources $9_1, \ldots, 9_K$ in areas $MA_1, \ldots, MA_K, MA_{K+1}$.

The acquired sound level estimating part 19 estimates the acquired sound level $P_{Sk}$ for each sound source in the same manner as in the first embodiment of the present invention.

Next, the filter coefficient calculating part 21 calculates filter coefficients for acquiring sound from each sound source $9_k$ at a desired volume and for reducing noise. In the first place, the condition for noise reduction is calculated. Let the frequency domain converted signals of the microphone acquired signals in the noise period be represented by $X_{N,1}(\omega)$ to $X_{N,M}(\omega)$. If the microphone acquired signals $X_{N,1}(\omega)$ to $X_{N,M}(\omega)$ in the noise period become zero after passing through the filters $12_1$ to $12_M$ and the adder 13, this means that noise could be reduced; hence, the condition for noise reduction is given by the following equation (17).

$$(X_{N,1}(\omega), \ldots, X_{N,M}(\omega))H(\omega) = 0 \quad (17)$$

By satisfying both of Eq. (17) and Eq. (15) for adjusting the acquired sound level, mentioned previously in the first embodiment of the present invention, it is possible to implement both of the acquired sound level adjustment and the noise reduction.

Next, solving the conditions of Eqs. (15) and (17) by the least square method for the filter coefficient matrix $H(\omega)$ gives the following equation (18).

$$H(\omega) = \left\{ \sum_{k=1}^{K} C_{Sk} R_{SkSk}(\omega) + C_N R_{NN}(\omega) \right\}^{-1} \sum_{k=1}^{K} C_{Sk} \sqrt{\frac{P_{opt}}{P_{Sk}}} R_{SkSk}(\omega) A_k(\omega) \quad (18)$$

$C_N$ is a weight constant for the noise reduction rate; an increase in the value of the constant increases the noise reduction rate. But, since an increase in $C_N$ decreases the sensitivity constraint for the sound source position and increases degradation of the frequency characteristics of the acquired sound signal, CN is normally set at an appropriate value approximately in the range of 0.1 to 10.0. The meanings of the other symbols are the same as in the first embodiment.

Next, the filter coefficients calculated by Eq. (18) are set in the filters $12_1$ to $12_M$ and used to filter the microphone acquired signals. The filtered signals are added together by the adder 13, from the added signal is provided as the output signal.

As described above, the second embodiment of the present invention permits reduction of noise in addition to the effect of acquired sound level adjustment in the first embodiment of the present invention.

The other parts of this embodiment are the same as in the first embodiment of the present invention, and hence they will not be described.

Third Embodiment

Figure 10:
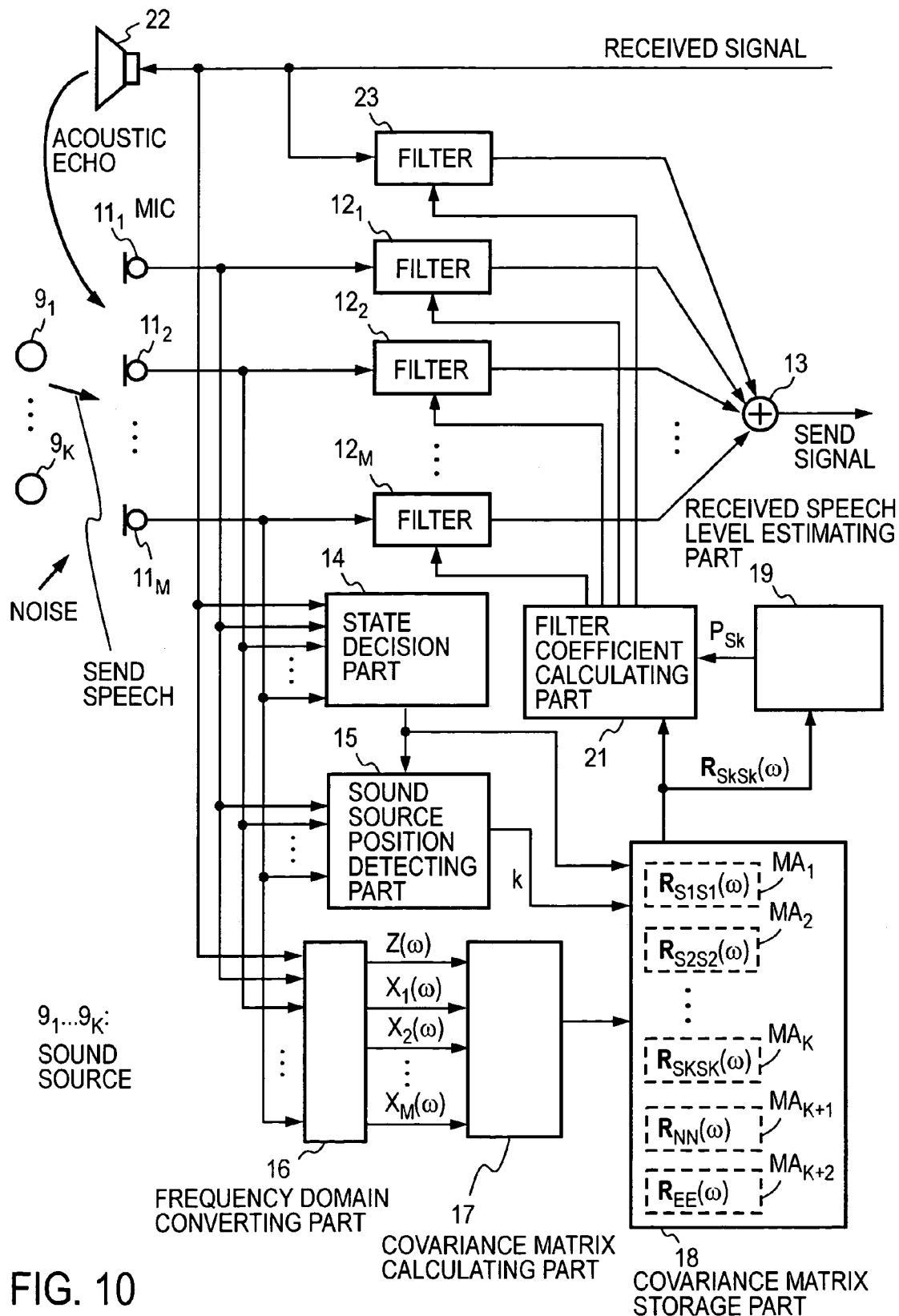
FIG. 10 is a block diagram illustrating a sound acquisition apparatus according to a third embodiment of the present invention.

FIG. 10 is a functional block diagram of a sound acquisition apparatus according to a third embodiment of the present invention.

The sound acquisition apparatus of this embodiment comprises a loudspeaker 22, microphones $11_1$ to $11_M$, filters $12_1$ to $12_M$ and 23, an adder 13, a state decision part 14, a sound source position detecting part 15, a frequency domain converting part 16, a covariance matrix calculating part 17, a covariance matrix storage part 18, an acquired sound level estimating part 19, and a filter coefficient calculating part 21.

This embodiment adds, to the sound acquisition apparatus of the second embodiment of the present invention, the loudspeaker 22 for reproducing a received signal from a participating speaker at a remote location and the filter 23 for filtering the received signal, with a view to implementing, in addition to the acquired sound level adjustment and the noise reduction by the second embodiment, cancellation of acoustic echoes that are loudspeaker reproduced signal components which are acquired by the microphones $11_1$ to $11_M$.

Figure 11:
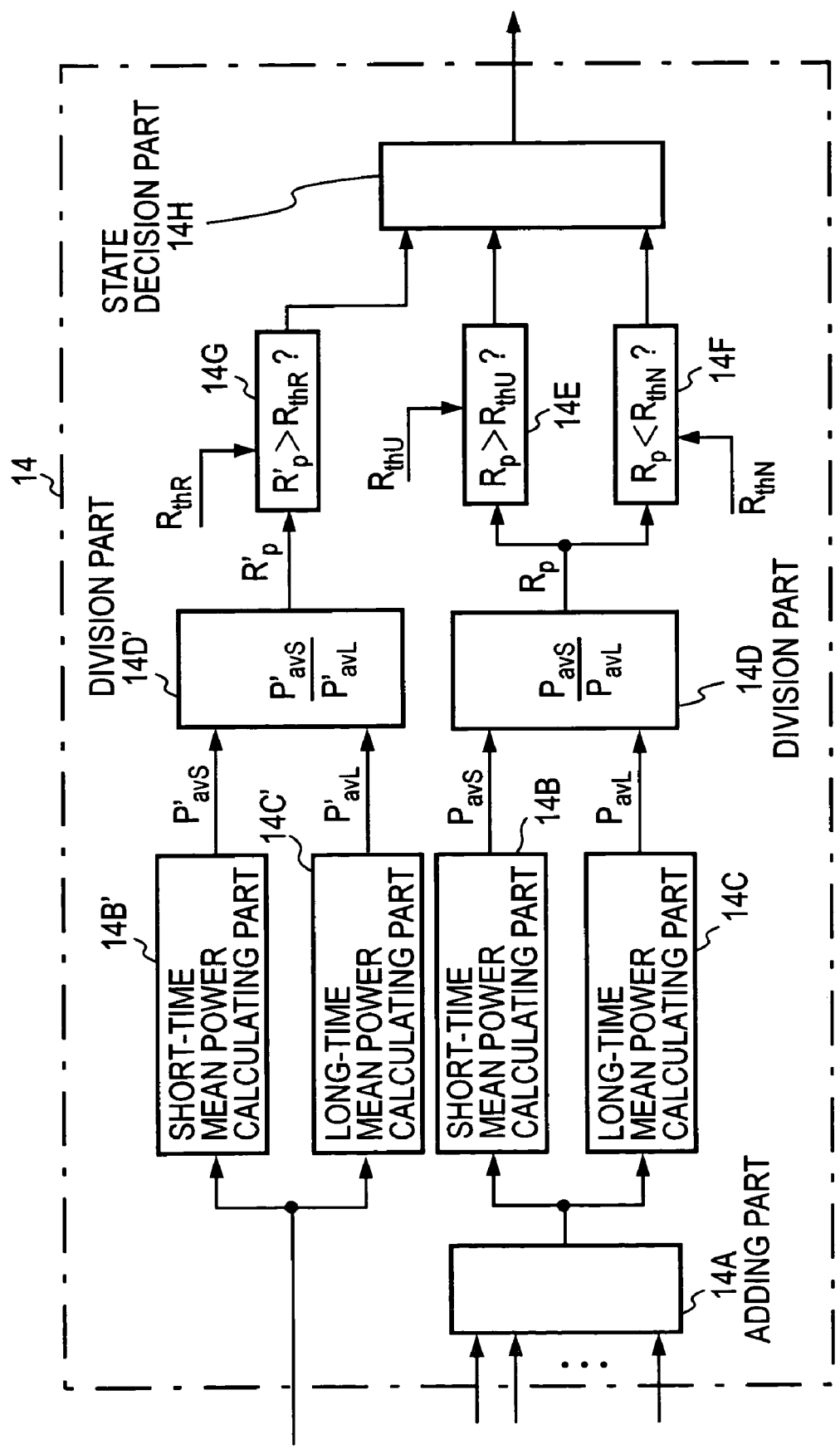
FIG. 11 is a block diagram showing an example of the configuration of the state decision part 14 in FIG. 7.

The state decision part 14 has, in addition to the FIG. 4 configuration of the state decision part 14 as shown in FIG. 11: a short-time mean power calculating part 14B' and a long-time mean power calculating part 14C' for calculating short-time mean power $P'_{avS}$ and long-time mean power $P'_{avL}$ of the received signal, respectively; a division part 14D' for calculating their ratio $R'_p = P'_{avS}/P'_{acL}$; a receive decision part 14G that compares the ratio $R'_p$ with a predetermined receive signal threshold value $R_{thR}$ and, if the former is larger than the latter, decides the state as a receiving period; and a state determining part 14H that determines the state based on the results of decision by the utterance decision part 14E, the noise decision part 14F and the receive decision part 14G When the result of decision by the receive decision part 14G is the receiving period, the state determining part 14H determines the state as the receiving period, irrespective of the results of decision by the utterance decision part 14E and the noise decision part 14F, whereas when the receive decision part 14G decides that the state is not the receiving period, the state determining part determines the state as the utterance or noise period according to the decisions by the utterance decision part 14E and the noise decision part 14F as in the case of FIG. 4.

When the result of decision by the state decision part 14 is the utterance period, the sound source position detecting part 15 detects the position of the sound source concerned in the same manner as in the first embodiment of the present invention.

Next, the frequency domain converting part 16 converts the microphone acquired signals and the received signal to frequency domain signals $X_1(\omega), \ldots, X_M(\omega)$ and $Z(\omega)$, and the covariance matrix calculating part 17 calculates covariance matrices of the frequency domain acquired signals and received signal. A covariance matrix $R_{XX}(\omega)$ of the frequency domain converted signals $X_1(\omega)$ to $X_M(\omega)$ of the microphone acquired signals and the frequency domain converted signal $Z(\omega)$ is calculated by the following equation (19).

$$R_{XX}(\omega) = \begin{pmatrix} Z(\omega) \\ X_1(\omega) \\ \vdots \\ X_M(\omega) \end{pmatrix} (Z(\omega)* \; X_1(\omega)* \; \cdots \; X_M(\omega)*) \qquad (19)$$

where * represents a complex conjugate.

Next, in the covariance matrix storage part 18, based on the result of detection by the sound source position detecting part 15 and on the result of decision by the state decision part 14, the covariance matrix $R_{XX}(\omega)$ is stored as covariance matrices $R_{SkSk}(\omega)$ of the acquired signals and the received signal for each sound source $9_k$ in the utterance period, as a covariance matrix $R_{NN}(\omega)$ of the acquired signals and the received signal in the noise period, and as a covariance matrix $R_{EE}(\omega)$ of the acquired signals and the received signal in the receiving period in areas $MA_1, \ldots, MA_K, MA_{K+1}, MA_{K+2}$, respectively.

The acquired sound level estimating part 19 calculates the acquired sound level $_{Sk}$ for each sound source $9_k$ by the following equation (20) based on the covariance matrices $R_{S1S1}, \ldots, R_{SKSK}$ for each sound source and predetermined weighted mixing vectors $A_1(\omega), \ldots, A_K(\omega)$ composed of M+1 elements for each sound source.

$$P_{Sk} = \frac{1}{W}\sum_{\omega=0}^{W} A_k(\omega)^H R_{SkSk}(\omega) A_k(\omega) \qquad (20)$$

Next, the filter coefficient calculating part 21 calculates filter coefficients for acquiring, at a desired volume, speech sound uttered from each sound source. Let $H_1(\omega)$ to $H_M(\omega)$ represent frequency domain converted versions of the filter coefficients of the filters $12_1$ to $12_M$ connected to the microphones, respectively, and let $F(\omega)$ represent a frequency domain converted version of the filter coefficient of the filter 23 for filtering the received signal. Then, let $H(\omega)$ represent a matrix of these filter coefficients given by the following equation (21).

$$H(\omega) = \begin{pmatrix} F(\omega) \\ H_1(\omega) \\ \vdots \\ H_M(\omega) \end{pmatrix} \qquad (21)$$

Further, let $X_{E,1}(\omega)$ to $X_{E,M}(\omega)$ represent frequency domain converted signals of the microphone acquired signal in the receiving period; let $Z_E(\omega)$ represent a frequency domain converted signal of the received signal; let $X_{N,1}(\omega)$ to $X_{N,M}(\omega)$ represent frequency domain converted signals of the microphone acquired signals in the noise period; let $Z_N(\omega)$ represent a frequency domain converted signal of the received signal; let $X_{Sk,1}(\omega)$ to $X_{Sk,M}(\omega)$ represent frequency domain converted signals of the microphone acquired signals in the utterance period of the k-th sound source $9_k$; and let $Z_{Sk}(\omega)$ represent a frequency domain converted signal of the received signal.

In this case, the condition that the filter coefficient matrix $H(\omega)$ needs to meet is that when the microphone acquired signals and the send signal are each subjected to filtering with the filter coefficient matrix $H(\omega)$ and the signals after filtering are added together, acoustic echo and noise signals are cancelled and only the send speech signal is sent at a desired level.

Accordingly, for the signals during the receiving period and the noise period, the following equations (22) and (23) are ideal conditions by which the filtered and added signals become 0.

$$(Z_E(\omega), X_{E,1}(\omega), \ldots, X_{E,M}(\omega))H(\omega)=0 \qquad (22)$$

$$(Z_N(\omega), X_{N,1}(\omega), \ldots, X_{N,M}(\omega))H(\omega)=0 \qquad (23)$$

For the signal during the utterance period, the following equation is an ideal condition by which the filtered and added signal becomes equivalent to a signal obtained by multiplying the microphone acquired signals and the received signal by the weighted mixing vector $A_k(\omega)$ composed of predetermined M+1 elements and a desired gain.

$$(Z_{Sk}(\omega), X_{Sk,1}(\omega), \cdots, X_{Sk,M}(\omega))H(\omega) = \qquad (24)$$
$$\sqrt{\frac{P_{opt}}{P_{Sk}}} (Z_{Sk}(\omega), X_{Sk,1}(\omega), \cdots, X_{Sk,M}(\omega))A_k(\omega)$$

The element $a_0(\omega)$ of the weighted mixing vector $A_k(\omega)=(a_0(\omega), a_{k1}(\omega), \ldots, a_{kM}(\omega))$ represents a weighting factor for the received signal; normally, it is set at $a_0(\omega)=0$.

Next, solving the conditions of Eqs. (22) to (24) by the least square method for the filter coefficient matrix $H(\omega)$ gives the following equation:

$$H(\omega) = \left\{ \sum_{k=1}^{K} C_{Sk} R_{SkSk}(\omega) + C_N R_{NN}(\omega) + C_E R_{EE}(\omega) \right\}^{-1} \qquad (25)$$
$$\sum_{k=1}^{K} C_{Sk} \sqrt{\frac{P_{opt}}{P_{Sk}}} R_{SkSk}(\omega) A_k(\omega)$$

$C_E$ is a weight constant for acoustic echo return loss enhancement; the larger the value, the more the acoustic echo return loss enhancement increases. But, an increase in the value $C_E$ accelerates deterioration of the frequency characteristics of the acquired signal and lowers the noise reduction characteristic. On this account, $C_E$ is usually set at an appropriate value approximately in the range of 0.1 to 10.0. The meanings of the other symbols are the same as in the second embodiment.

In this way, the filter coefficients can be determined in such a manner as to adjust volume and reduce noise.

Next, the filter coefficients, obtained by Eq. (25), are set in the filters $12_1$ to $12_M$ and 23, which filter the microphone acquired signals and the received signal, respectively. The filtered signals are added together by the adder 13, from which the added signal is output as the send signal. The other parts are the same as in the second embodiment of the present invention, and hence no description will be repeated.

As described above, the third embodiment of the present invention permits implementation of acoustic echo cancellation in addition to the effects of acquired sound level adjustment and noise reduction by the second embodiment of the present invention. While the third embodiment has been described as adding the acoustic echo cancellation capability to the second embodiment, the acoustic echo cancellation capability may also be added to the first embodiment. In such an instance, the noise decision part 14F is removed in FIG. 11 showing in detail the state decision part 14 in FIG. 10, and the covariance matrix calculating part 17 in FIG. 10 does not calculate the covariance matrix $R_{NN}(\omega)$ in the noise period. Accordingly, the calculation of filter coefficients in the filter coefficient calculating part 21 may be carried out by the following equation, which is evident from the foregoing description.

$$H(\omega) = \left\{ \sum_{k=1}^{K} C_{Sk} R_{SkSk}(\omega) + C_E R_{EE}(\omega) \right\}^{-1} \sum_{k=1}^{K} C_{Sk} \sqrt{\frac{P_{opt}}{P_{Sk}}} R_{SkSk}(\omega) A_k(\omega) \quad (26)$$

Fourth Embodiment

Though described above as an embodiment having added the acoustic echo cancellation capability to the acquired sound level adjustment and noise reduction capabilities of the second embodiment, the third embodiment of FIG. 10 may also be configured as a sound acquisition apparatus equipped with only the noise reduction and acoustic echo cancellation capabilities. An example of such a configuration is shown in FIG. 12.

Figure 12:
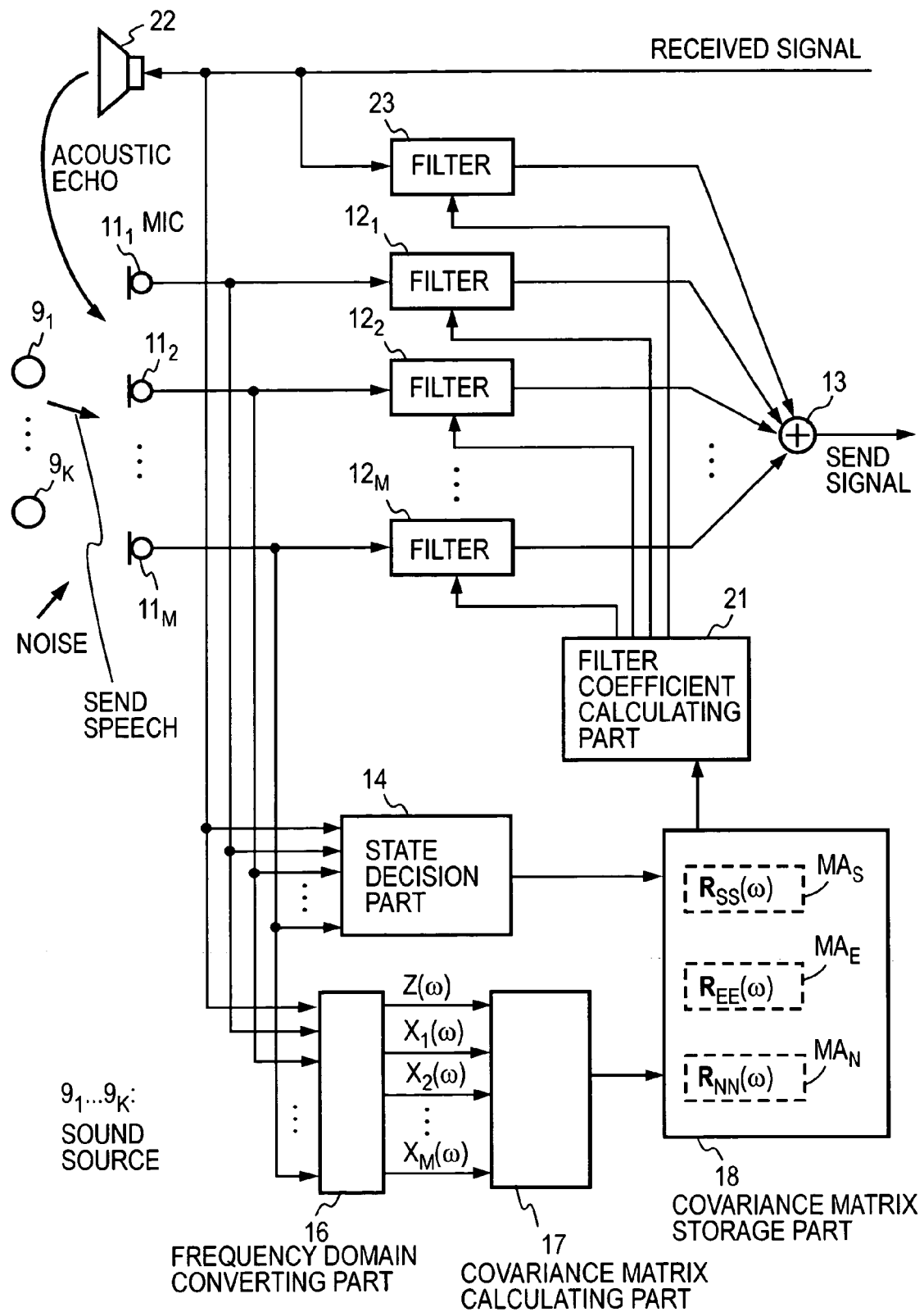
FIG. 12 is a block diagram illustrating a sound acquisition apparatus according to a fourth embodiment of the present invention.

As illustrated in FIG. 12, this embodiment has a configuration in which the sound source position detecting part 15 and the acquired sound level estimating part 19 in the FIG. 10 configuration are removed and the covariance matrix calculating part 17 calculates a covariance matrix $R_{SS}(\omega)$ of the send signal, a covariance matrix $R_{EE}(\omega)$ of the received signal, and a covariance matrix $R_{NN}(\omega)$ of the noise signal, which are stored in storage areas $MA_S$, $MA_E$ and $MA_N$ of the covariance storage part 18, respectively. The acoustic echo cancellation capability can be implemented using at least one microphone, but an example using M microphones is shown.

The state decision part 14 decides, as in the FIG. 10 embodiment, the utterance period, the receiving period, and the noise period from the signals acquired by the microphones $12_1$ to $12_M$ and the received signal; the state decision part is identical in concrete configuration and in operation with the counterpart depicted in FIG. 11. The acquired signals and the received signal are converted by the frequency domain converting part 16 to frequency domain acquired signals $X_1(\omega)$ to $X_M(\omega)$ and a frequency domain received signal $Z(\omega)$, which are provided to the covariance matrix calculating part 17.

Next, the covariance matrix calculating part 17 generates a covariance matrix of the frequency domain acquired signals and received signal. The covariance matrix $R_{XX}(\omega)$ of the frequency domain converted signals $X(\omega)$ to $X_M(\omega)$ of the microphone acquired signals and the frequency domain converted signal $Z(\omega)$ of the received signal is calculated by the following equation (27).

$$R_{XX}(\omega) = \begin{pmatrix} Z(\omega) \\ X_1(\omega) \\ \vdots \\ X_M(\omega) \end{pmatrix} (Z(\omega)*, X_1(\omega)*, \cdots, X_M(\omega)*) \quad (27)$$

where * represents a complex conjugate.

Next, in the covariance matrix storage part 18, based on the result of detection by the state decision part 14, the covariance matrix $R_{XX}(\omega)$ is stored as a covariance matrix $R_{SS}(\omega)$ of the acquired signals and the received signal for each sound source $9_k$ in the utterance period, as a covariance matrix $R_{NN}(\omega)$ of the acquired signals and the received signal in the noise period, and as a covariance matrix $R_{EE}(\omega)$ of the acquired signals and the received signal in the receiving period in areas $MA_S$, $MA_N$, and $MA_E$, respectively.

Next, the filter coefficient calculating part 21 acquires speech sound uttered from sound sources, and calculates filter coefficients for canceling acoustic echo and noise. Let $H_1(\omega)$ to $H_M(\omega)$ represent frequency domain converted versions of the filter coefficients of the filters $12_1$ to $12_M$ connected to the microphones $11_1$ to $11_M$, respectively, and let $F(\omega)$ represent a frequency domain converted version of the filter coefficient of the filter 23 for filtering the received signal. Then, let $H(\omega)$ represent a matrix of these filter coefficients given by the following equation (28).

$$H(\omega) = \begin{pmatrix} F(\omega) \\ H_1(\omega) \\ \vdots \\ H_M(\omega) \end{pmatrix} \quad (28)$$

Further, let $X_{E,1}(\omega)$ to $X_{E,M}(\omega)$ represent frequency domain converted signals of the microphone acquired signals in the receiving period; let $Z_E(\omega)$ represent a frequency domain converted signal of the received signal; let $X_{N,1}(\omega)$ to $X_{N,M}(\omega)$ represent frequency domain converted signals of the microphone acquired signals in the noise period; let $Z_N(\omega)$ represent a frequency domain converted signal of the received signal; let $X_{Sk,1}(\omega)$ to $X_{Sk,M}(\omega)$ represent frequency domain converted signals of the microphone acquired signals in the utterance period; and let $Z_S(\omega)$ represent a frequency domain converted signal of the received signal in the utterance period.

In this case, the condition that the filter coefficient matrix $H(\omega)$ needs to meet is that when the microphone acquired signals and the send signal are each subjected to filtering with the filter coefficient matrix $H(\omega)$ and the signals after filtering are added together, acoustic echo and noise signals are cancelled and only the send speech signal is sent at a desired level.

Accordingly, for the signals during the received signal period and the noise period, the following equations (29) and (30) are ideal conditions by which the filtered and added signals become 0.

$$(Z_E(\omega), X_{E,1}(\omega), \ldots, X_{E,M}(\omega),)H(\omega)=0 \quad (29)$$

$$(Z_N(\omega), X_{N,1}(\omega), \ldots, X_{N,M}(\omega))H(\omega)=0 \quad (30)$$

For the signal during the utterance period, the following equation is an ideal condition by which the filtered and added signal becomes equivalent to a signal obtained by multiplying the microphone acquired signals and the received signal by the weighted mixing vector A(ω) composed of predetermined M+1 elements.

$$(Z_S(\omega), X_{S,1}(\omega), \ldots, X_{S,M}(\omega))H(\omega)= \\ (Z_S(\omega), X_{S,1}(\omega), \ldots, X_{S,M}(\omega))A(\omega) \quad (31)$$

The first element $a_0(\omega)$ of the weighted mixing vector $A(\omega)=(a_0(\omega), a_{k1}(\omega), \ldots, a_{kM}(\omega))$ represents a weighting factor for the received signal; normally, it is set at $a_0(\omega)=0$.

Next, solving the conditions of Eqs. (29) to (31) by the least square method for the filter coefficient matrix H(ω) gives the following equation:

$$H(\omega)=\{R_{SS}(\omega)+C_N R_{NN}(\omega)+C_E R_{EE}(\omega)\}^{-1} R_{SS}(\omega) A(\omega) \quad (32)$$

$C_E$ is a weight constant for acoustic echo return loss enhancement; the larger the value of the weight constant, the more the acoustic echo return loss enhancement increases. But, an increase in the value $C_E$ accelerates deterioration of the frequency characteristics of the acquired signal and lowers the noise reduction characteristic. On this account, $C_E$ is usually set at an appropriate value approximately in the range of 0.1 to 10.0. The meanings of the other symbols are the same as in the second embodiment.

In this way, the filter coefficients can be determined in such a manner as to adjust volume and reduce noise.

Next, the filter coefficients, obtained by Eq. (32), are set in the filters $12_1$ to $12_M$ and 23, which filter the microphone acquired signals and the received signal, respectively. The filtered signals are added together by the adder 13, from which the added signal is output as the send signal. The other parts are the same as in the second embodiment of the present invention, and hence no description will be repeated.

As described above, the fourth embodiment of the present invention permits implementation of acoustic echo cancellation in addition to the effect of noise reduction.

Fifth Embodiment

Figure 13:
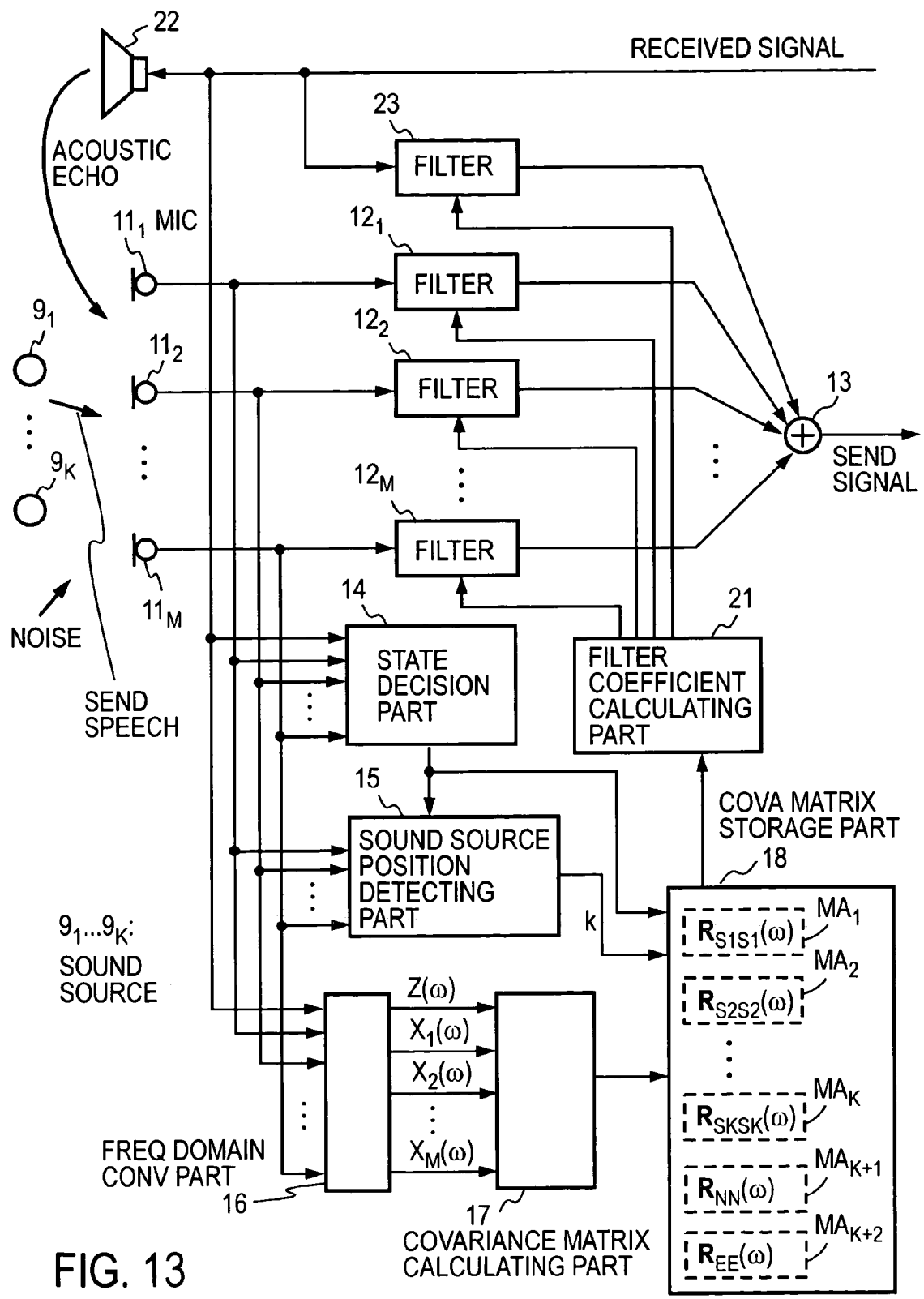
FIG. 13 is a block diagram illustrating a sound acquisition apparatus according to a fifth embodiment of the present invention.

FIG. 13 illustrates a fifth embodiment. According to the fifth embodiment, in the fourth embodiment of FIG. 12, sound source positions are detected during the utterance period, a covariance matrix is calculated for each sound source and stored and during the noise period a covariance matrix for noise is calculated and stored. Then, these stored covariance matrices are used to calculate filter coefficients for canceling noise and acoustic echo. The microphone acquired signals and the received signal are filtered using these filter coefficients to thereby obtain a send signal from which noise and acoustic echo have been cancelled.

The configuration of the fifth embodiment is common to the configuration of the third embodiment except the removal of the acquired sound level estimating part 19 in FIG. 10.

The state decision part 14 detects the utterance period, the receiving period and the noise period as in the third embodiment. When the result of decision by the state decision part 14 is the utterance period, the sound source position detecting part 15 estimates the position of each sound source $9_k$. The sound source position estimating method is the same as that used in the first embodiment of FIG. 1, no description will be repeated.

Next, in the frequency domain converting part 16 the acquired signals and the received signal are converted to frequency domain signals, which are provided to the covariance matrix calculating part 17.

The covariance matrix calculating part 17 calculates covariance matrices $R_{S1S1}(\omega)$ to $R_{SKSK}(\omega)$ of the acquires signals for the respective sound sources $9_k$ and the received signal, a covariance matrix $R_{EE}(\omega)$ in the receiving period and a covariance matrix $R_{NN}(\omega)$ in the noise period. The covariance matrix storage part 18 stores the covariance matrices $R_{S1S1}(\omega)$ to $R_{SKSK}(\omega)$, $R_{EE}(\omega)$ and $R_{NN}(\omega)$ in the corresponding areas $MA_1$ to, $MA_K$, $MA_{K+1}$ and $MA_{K+2}$, respectively, based on the result of decision by the state decision part 14 and the results of position detection by the sound source position detecting part 15.

Upon the send speech sound being acquired, the filter coefficient calculating part 21 calculates filter coefficients for canceling acoustic echo and noise. As is the case with the third embodiment, solving the conditional expression for the filter coefficient matrix H(ω) by the least square method gives the following equation:

$$H(\omega) = \left\{\sum_{k=1}^{K} C_{Sk} R_{SkSk}(\omega) + C_N R_{NN}(\omega) + C_E R_{EE}(\omega)\right\}^{-1} \quad (33)$$

$$\sum_{k=1}^{K} C_{Sk} R_{SkSk}(\omega) A_k(\omega)$$

In the above, $C_{S1}$ to $C_{SK}$ are weight constants of sensitivity constraints for the respective sound sources, $C_E$ is a weight constant for the echo return loss enhancement, and $C_N$ is a weight constant for the noise reduction rate.

The filter coefficients thus obtained are set in the filters $12_1$ to $12_M$ and 23, which filter the microphone acquired sound signals and the received signal, respectively. The filtered signals are added together by the adder 13, from which the added signal is output as the send signal. The other parts are the same as in the second embodiment of the present invention, and hence no description will be repeated. The fifth embodiment permits generation of a send signal having cancelled therefrom acoustic echo and noise as is the case with the third embodiment. Further, according to the fifth embodiment, sensitivity constraints can be imposed on a plurality of sound sources, and sensitivity can be held for a sound source having uttered speech sound previously as well. Accordingly, this embodiment is advantageous in that that even when the sound source moves, the speech quality does not deteriorate in the initial part of the speech sound since the sensitivity for the sound source is maintained if it has uttered speech sound in the past.

Sixth Embodiment

A sound acquisition apparatus according to a sixth embodiment of the present invention will be described.

In the sound acquisition apparatus of this embodiment, the weighting factors $C_{S1}$ to $C_{SK}$ of the sensitivity constraints for the sound source positions $9_k$ in the sound acquisition apparatuses of the first to third and fifth embodiments are changed on a timewise basis.

The time-variant weighting factors $C_{S1}$ to $C_{SK}$ of the sensitivity constraints for the sound sources $9_1$ to $9_K$ are set smaller in order of utterance in the past. A first method is to reduce the weighting factor $C_{Sk}$ with an increase in the elapsed time from the detection of each already detected sound source position to the detection of the most recently detected sound source position. A second method is to set the weighting factor $C_{Sk}$ smaller in order of detection of K sound source positions.

Figure 14:
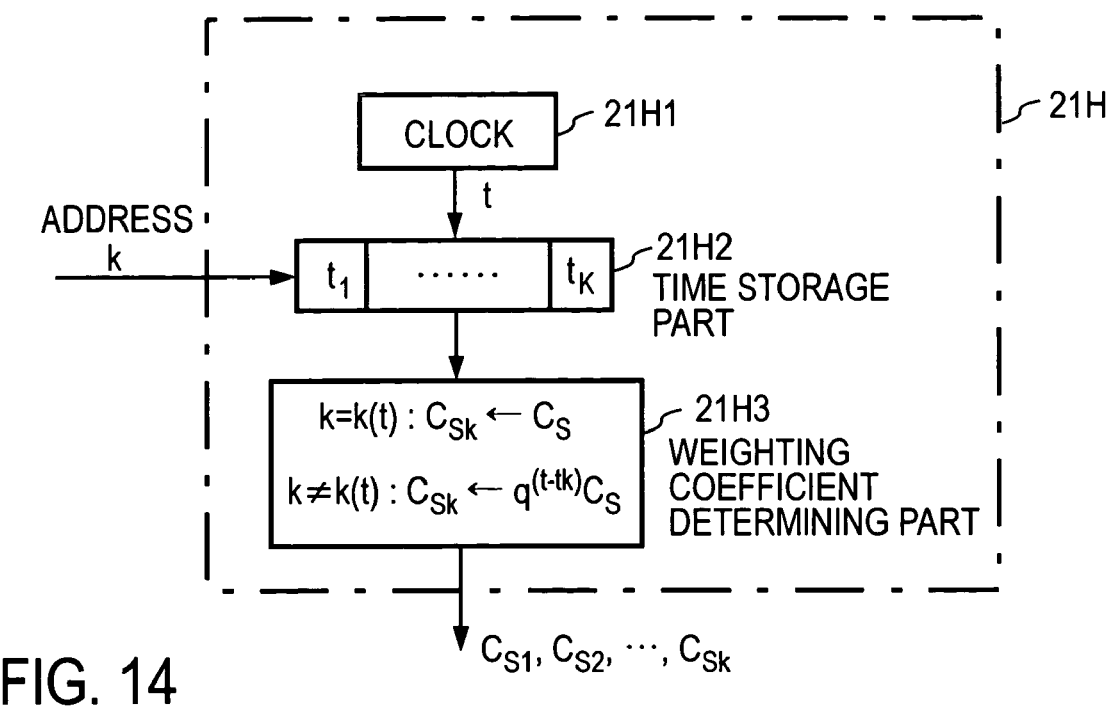
FIG. 14 is a block diagram showing an example of the configuration of a weighting factor setting part 21H in FIG. 4.

FIG. 14 illustrates in block form the functional configuration of a weighting factor setting part 21H for implementing the above-said first method. The weighting factor setting part 21H is made up of: a clock 21H1 that outputs time; a time storage part 21H2 that upon each detection of sound source position, overwrites the time t of detection, using, as an address, the number k representing the detected sound source $9_k$; and a weighting factor determining part 21H3. Based on the time of detection of the sound source position stored in the time storage part 21H2, the weighting factor determining part 21H3 assigns a predetermined value $C_S$ as the weighting factor $S_{Ck}$ to the currently detected sound source of a number k(t), and assigns a value $q^{(t-tk)}C_S$ as the weighting factor $C_{Sk}$ to each of the other sound sources of numbers k≠k(t) in accordance with the elapsed time t-tk after the detection time $t_k$. q is a predetermined value in the range of 0<q≦1. In this way, the weighting factors $C_{S1}$ to $C_{SK}$ of sensitivity constraints are determined for the respective sound sources, and they are provided to 21A1 to 21AK.

Figure 15:
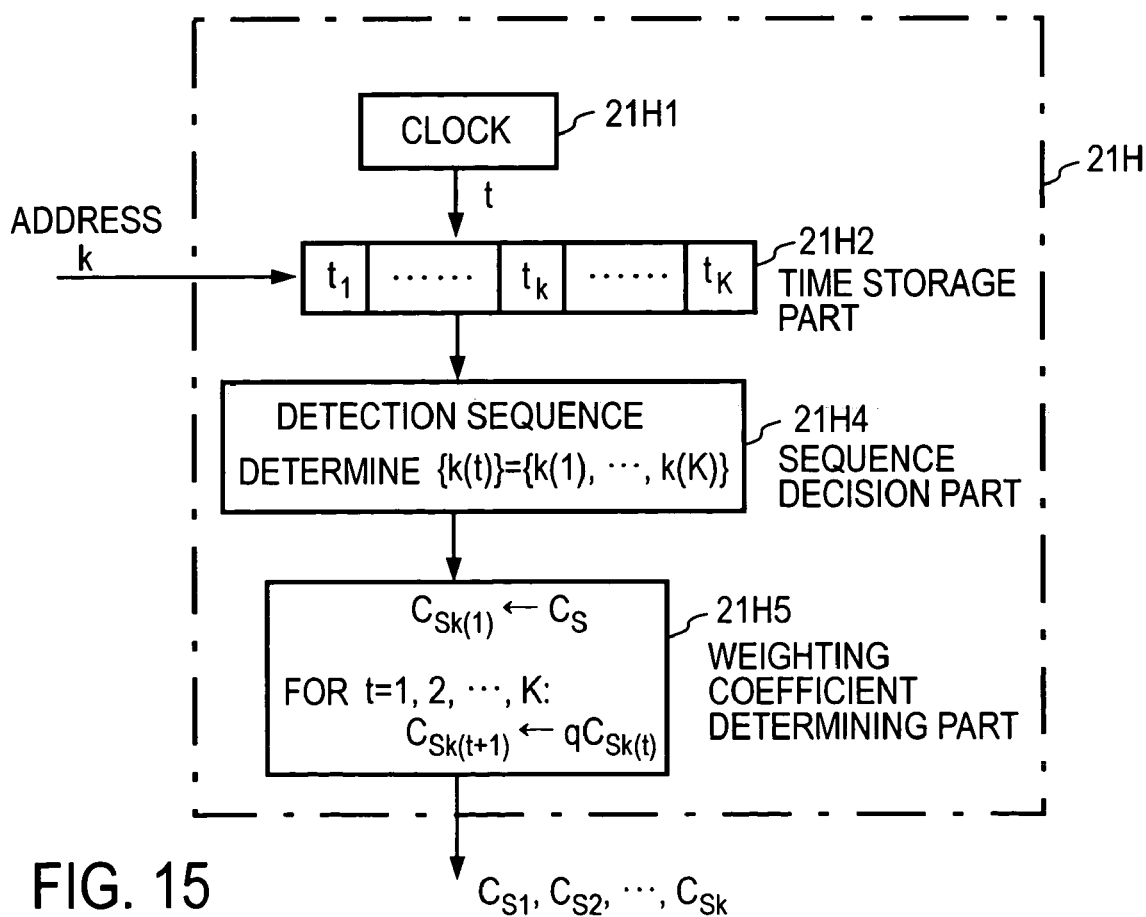
FIG. 15 is a block diagram showing another example of the configuration of a weighting factor setting part 21H in FIG. 4.

FIG. 15 illustrates in block form the functional configuration of a weighting factor setting part 21H for implementing the above-said second method; in this example, it is made up of a clock 21H1, a time storage part 21H2, an order decision part 21H4, and a weighting factor determining part 21H5. The order decision part 21H4 decides the order of detection of the positions of the sound sources $9_1$ to $9_K$ (the newest order) {k(t)}={k(1), . . . , k(K)} from the times stored in the time storage part 21H2. The weighting factor determining part 21H5 assigns a predetermined value $C_S$ as a weighting factor $C_{Sk(1)}$ to the most recently detected sound source $9_{k(1)}$. For the other sound sources, the weighting factor determining part calculates $C_{Sk(t+1)} \leftarrow qC_{Sk(t)}$ for t=1, 2, . . . , K−1 to obtain weighting factors $C_{Sk(2)}, \ldots, C_{Sk(t)}$. These weighting factors $C_{Sk(2)}$ to $C_{Sk(t)}$ are rearranged following the order {k(1), . . . , k(K)}, thereafter being output as weighting factors $C_{S1}, \ldots, C_{SK}$. The value of q is a preset value in the range of 0<q<1.

By varying the weights of sensitivity constrains for the respective sound sources as described above, it is possible to reduce the sensitivity constrains for the sound source positions where utterance was made in the past. Thus, as compared with the sound acquisition apparatuses of the first to third embodiments, the apparatus of this embodiment reduces the number of sound sources to be subjected to sensitivity constraints, enhancing the acquired sound level adjustment capability and the noise and acoustic echo cancellation functions.

The other parts are the same as those in the first to third and fifth embodiments of the present invention, and hence no description will be repeated.

Seventh Embodiment

A sound acquisition apparatus according to a seventh embodiment of the present invention will be described.

Figure 16:
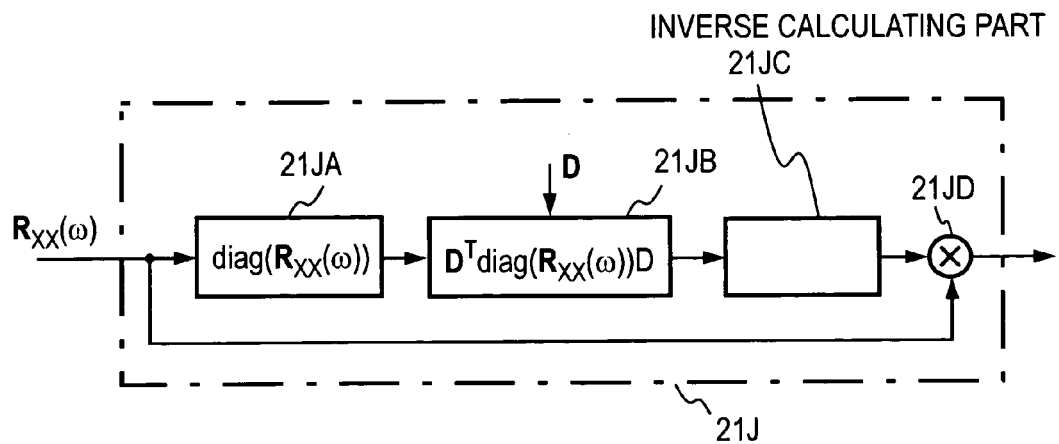
FIG. 16 is a block diagram showing an example of the configuration of a whitening part 21J in FIG. 4.

The sound acquisition apparatus according to the seventh embodiment of the present invention features whitening the covariance matrix $R_{XX}(\omega)$ in the filter coefficient calculating part 21 of the sound acquisition apparatus according to the first to sixth embodiments of the present invention. FIG. 16 illustrates the functional configuration of a representative one of whitening parts 21J1 to 21JK indicated by the broken lines in the filter coefficient calculating part 21 shown in FIG. 4. The whitening part 21J comprises a diagonal matrix calculating part 21JA, a weighting part 21JB, an inverse operation part 21JC and a multiplication part 21JD. The diagonal matrix calculating part 21JA generates a diagonal matrix diag($R_{XX}(\omega)$) of the covariance matrix $R_{XX}(\omega)$ fed thereto. The weighting part 21JB assign weights to the diagonal matrix by calculating the following equation based on a matrix D of a predetermined arbitrary M or M+1 rows.

$$D^T \text{diag}(R_{XX}(\omega))D \tag{34}$$

The inverse calculation part 21JC calculates an inverse of Eq. (34)

$$1/\{D^T \text{diag}(R_{XX}(\omega))D\} \tag{35}$$

In the above $^T$ indicates a transpose of the matrix. In the multiplication part 21JD the result of calculation by the inverse calculation part 21JC is multiplied by each covariance matrix $R_{XX}(\omega)$ input thereto to obtain a whitened covariance matrix.

With the covariance matrix thus whitened, the filter coefficients obtained in the filter coefficient calculating part 21 no linger change with spectral changes of the send signal, acquired signal and the noise signal. As a result, the acquired sound level adjustment capability and the acoustic echo and noise cancellation capabilities do not change with the spectral changes—this makes it possible to achieve steady acquired sound level adjustment and acoustic echo and noise cancellation.

The other parts are the same as in the first to fourth embodiments of the present invention, and hence no description will be repeated.

Eighth Embodiment

A sound acquisition apparatus according to an eighth embodiment of the present invention will be described.

The sound acquisition apparatus of the eighth embodiment features that the covariance matrix storage part 18 of the sound acquisition apparatus according to the first to seventh embodiments of the present invention averages an already stored covariance matrix and a covariance matrix newly calculated by the covariance matrix calculating part 17 and stores the averaged covariance matrix as the current one.

The covariance matrices are averaged, for example, by the method described below. Letting the already stored covariance matrix be represented by $R_{XX,old}(c)$ and the covariance matrix newly calculated by the covariance matrix calculating part 17 by $R_{XX,new}(\omega)$, the following equation is used to calculate an average covariance matrix $R_{XX}(\omega)$.

$$R_{XX}(\omega)=(1-p)R_{XX,new}(\omega)+pR_{XX,old}(\omega) \tag{36}$$

where p is a constant that determines the time constant of the average and takes a value 0≦p<1.

Figure 17:
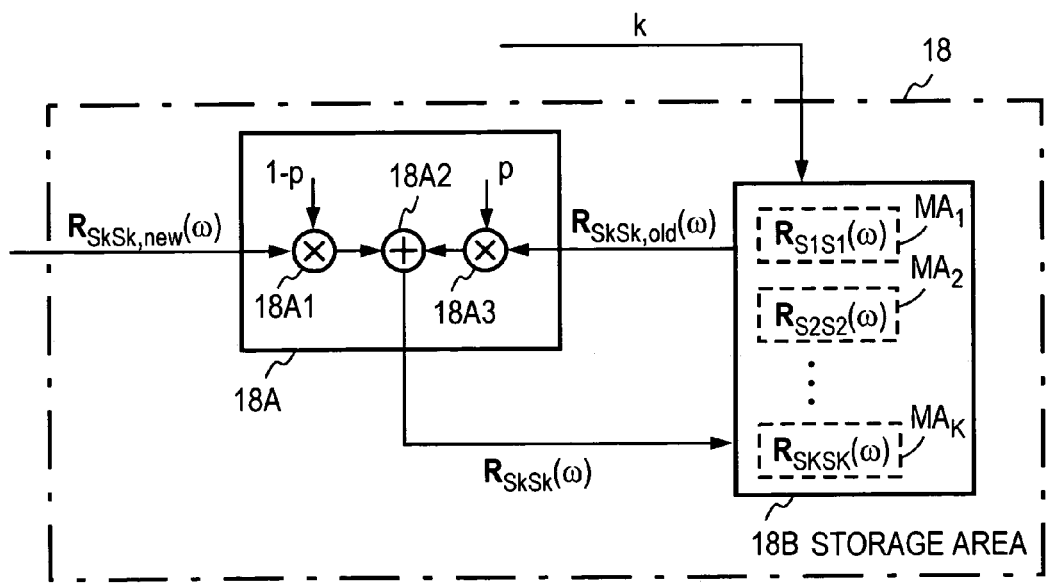
FIG. 17 is a block diagram an example of a covariance matrix storage part 18 that is used when each embodiment is equipped with a covariance matrix averaging function.

FIG. 17 illustrates the functional configurations of the covariance matrix storage part 18 and an averaging part 18A provided therein. The averaging part 18A comprises a multiplier 18A1, an adder 18A2, and a multiplier 18A3. The covariance matrix $R_{SkSk}(\omega)$ corresponding to the sound source $9_k$, calculated by the covariance matrix calculating part 17, is provided as a new covariance matrix $R_{SkSk,new}(\omega)$ to the multiplier 18A1 and is multiplied by (1−p), and the multiplied output is applied to the adder 18A2. On the other hand, the covariance matrix $R_{SkSk}(\omega)$ corresponding to the sound source $9_k$ is read out of the storage area 18B then provided as a old covariance matrix $R_{SkSk,old}(\omega)$ to the multiplier 18A3 and multiplied by the constant p. The multiplied output is added by the adder 18A2 to the output $(1-p)R_{SkSk,new}(\omega)$ from the multiplier 18A1, and the thus obtained average covariance matrix $R_{SkSk}(\omega)$ is overwritten in the storage area corresponding to the sound source $9_k$.

By averaging covariance matrices and storing the averaged covariance matrix as described above, it is possible to lessen the influence of a circuit noise or similar disturbance as compared with that before averaging, hence providing an accurate covariance matrix—this makes it possible to determine filter coefficients that enhance the acquired sound level adjustment, noise cancellation or acoustic echo cancellation performance.

The other parts are the same as in the first to fifth embodiments of the present invention, and hence no description will be repeated.

Incidentally, the present invention can be implemented by dedicated hardware; alternatively, it is possible that a program for implementing the invention is recorded on a computer-readable recording medium and read into a computer for execution. The computer-readable recording medium refers to a storage device such as a floppy disk, an magneto-optical disk, CD-ROM, DVD-ROM, a nonvolatile semiconductor memory, or an internal or external hard disk. The computer-readable recording medium also includes a medium that dynamically holds a program for a short period of time (a transmission medium or transmission wave) as in the case of transmitting the program via the Internet, and a medium that holds the program for a fixed period of time, such as a volatile memory in the computer system serving as a server in that case.

EFFECT OF THE INVENTION

Next, to demonstrate the effectiveness of the first embodiment of the sound acquisition apparatus according to the present invention, FIGS. 18A and 18B show the results of simulations with microphones disposed at corners of a square measuring 20 cm by 20 cm. The simulation conditions are—number of microphones: 4, signal-to-noise ratio: about 20 dB, room reverberation time: 300 ms, and number of speakers: 2 (speaker A at a position 50 cm away from the center of the square in a direction at right angles to one side thereof, speaker B at a position 200 cm away from the center of the square in a direction at 90° to the speaker A). FIG. 18A shows microphone received signal waveforms obtained when the speakers A and B spoke alternately under the above-mentioned conditions. Comparison between the speech waveforms of the speakers A and B indicates that the speech waveform of the speaker B is small in amplitude. FIG. 18B shows waveforms processed by the present invention. The speech waveforms of the speakers A and B are nearly equal in amplitude, from which the effect of acquired sound level adjustment can be confirmed.

Figure 19:
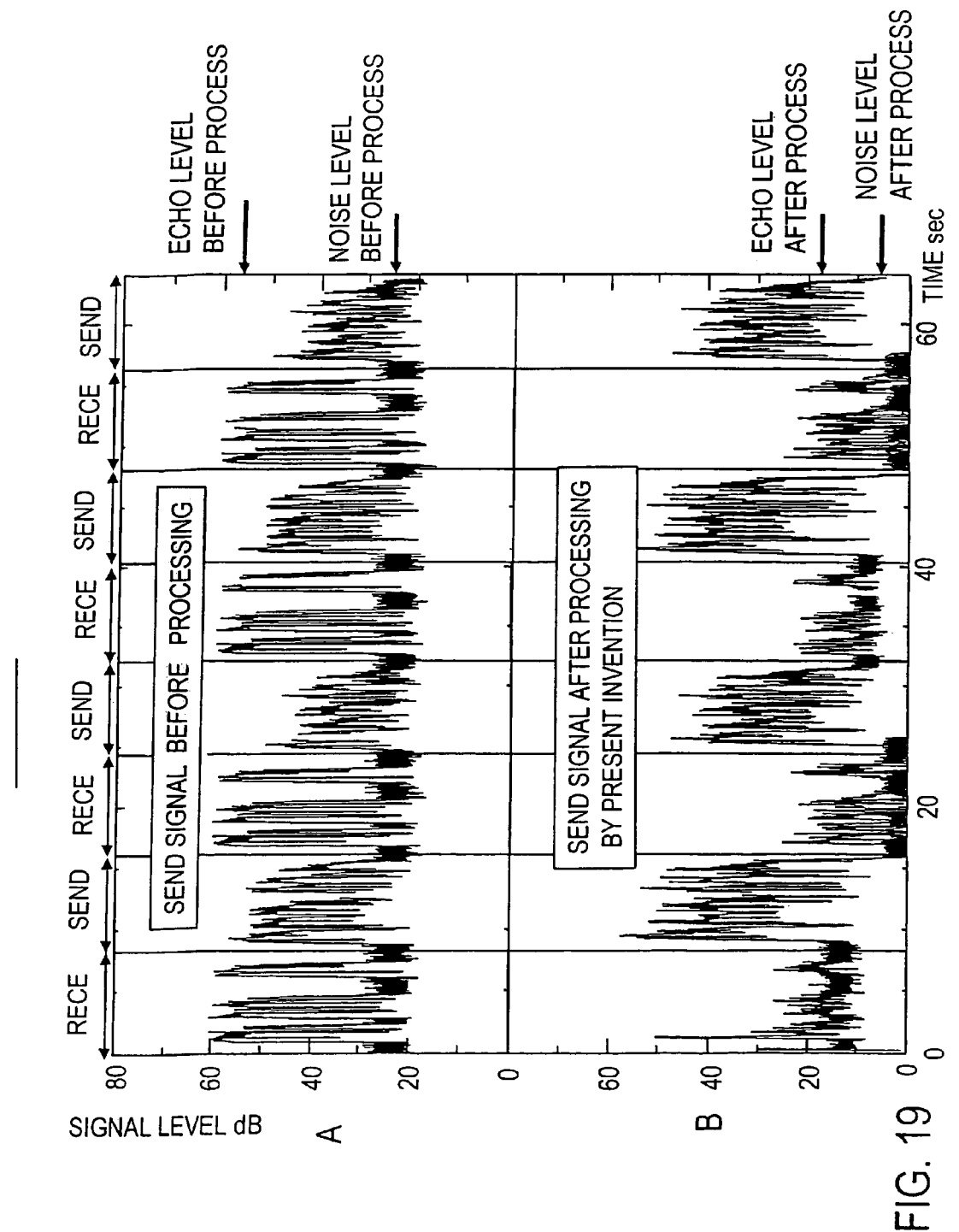
FIG. 19 is a diagram showing received and send speech waveform by simulation, which show acoustic echo and noise cancellation according to a third embodiment.
Figure 20:
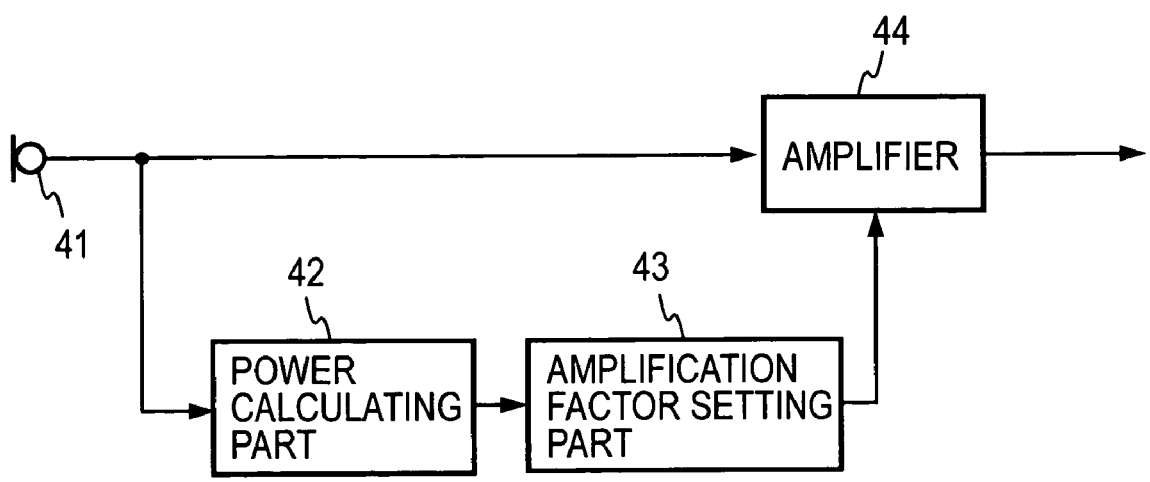
FIG. 20 is a block diagram illustrating a conventional sound acquisition apparatus.

FIG. 19 shows simulation results obtained with the third embodiment shown in FIG. 10. The simulation conditions are—number M of microphones: 4, signal-to-noise ratio of send signal before processed: 20 dB, send signal-to-acoustic echo ratio: −10 dB, and room reverberation time: 300 msec. FIG. 19 shows the send signal levels obtained when signal sending and receiving are repeated alternately under the above-mentioned conditions.

Row A shows the send signal level before processing, and Row B the send signal level after processing by the third embodiment. The above results indicate that the third embodiment reduces the acoustic echo about 40 dB and the noise signal about 15 dB, from which it can be confirmed that the embodiment of the invention is effective.

As described above, according to the first embodiment of the present invention, it is possible to obtain a send signal of a volume adjusted for each sound source position by: detecting the sound source position from signals picked up by a plurality of microphones; calculating filter coefficients based on a covariance matrix in the utterance period for each sound source position; filtering the microphone acquired signals by the filter coefficients; and adding the filtered signals.

According to the second embodiment of the present invention, it is possible to achieve noise cancellation as well as the acquired sound level adjustment by determining the filter coefficients by using a covariance matrix in the noise period in addition to the covariance in the utterance period in the first embodiment.

According to the third embodiment of the present invention, it is possible to achieve acoustic cancellation by determining the filter coefficients by using a covariance matrix in the receiving period in addition to the covariance matrix in the utterance period in the first or second embodiment.

According to the fourth embodiment of the present invention, it is possible to reproduce the received signal by a loudspeaker and cancel acoustic echo by determining the filter coefficients by using the covariance matrix in the utterance period and the covariance matrix in the receiving period.

According to the fifth embodiment of the present invention, it is possible to further cancel noise by determining the filter coefficients by using the covariance matrix in the noise period in addition to the covariance matrices in the utterance and receiving periods in the fourth embodiment.

According to the sixth embodiment of the present invention, it is possible to further enhance the acquired sound level adjustment, noise cancellation or acoustic echo cancellation performance by assigning a smaller weighting factor to the covariance matrix of older utterance at the time of calculating the filter coefficients in the first, second, third and fifth embodiments.

According to the seventh embodiment of the present invention, it is possible to implement acquired sound level adjustment, noise cancellation and acoustic echo cancellation not so susceptible to signal spectral changes by whitening the covariance matrix at the time of calculating the filter coefficients in the first to sixth embodiment.

According to the eighth embodiment of the present invention, when the covariance matrix is stored in the first to seventh embodiments, the covariance matrix and that already stored in the corresponding area are averaged and a weighted mean covariance matrix is stored, by which it is possible to obtain a more accurate covariance matrix and determine filter coefficients that provide increased performance in the acquired sound level adjustment, noise reduction and acoustic echo cancellation.

The invention claimed is:

1. A sound acquisition method for acquiring a signal of sound from each sound source by microphones of plural channels according to the present invention, comprising:

a state deciding step including an utterance deciding step of deciding an utterance period from signals acquired by said plural-channel microphones;

a sound source position detecting step of detecting the position of said each sound source from said acquired signals when the utterance period is decided in said utterance deciding step;

a frequency domain converting step of converting said acquired signals to frequency domain signals;

a covariance matrix calculating step of calculating a covariance matrix of said frequency domain acquired signals;

a covariance matrix storage step of storing said covariance matrix for each sound source based on the result of detection in said sound position detecting step;

a filter coefficient calculating step of calculating filter coefficients of said plural channels based on said stored covariance matrix and a predetermined output level;

a filtering step of filtering the acquired signals of said plural channels by filter coefficients of said plural channels, respectively;

an adding step of adding together the results of filtering in said plural channels, and providing the added output as a send signal; and an acquired sound level estimating step of estimating the acquired sound level for utterance from said each sound source based on a covariance matrix stored corresponding to said each sound source, and wherein said filter coefficient calculating step includes a step of calculating said filter coefficients of said plural channels based on said covariance matrix stored corresponding to said each sound source and said estimated acquired sound level so that the output level becomes a desired level.

2. The sound acquisition method according to claim 1, wherein: said state decision step includes a noise decision step of deciding a noise period from said acquired signals of said plural channels;

said covariance matrix calculating step includes a step of calculating, when said noise period is decided, a covariance matrix of acquired signal during said noise period as a covariance matrix of noise;

said covariance matrix storage step is so adapted as to store said covariance matrix of said acquired signal in correspondence to each sound source and store said covariance matrix of said noise period; and said filter coefficient calculating step is so adapted as to calculate filter coefficients of said plural channels, based on a covariance matrix stored corresponding to said each sound source in said utterance period and a stored covariance matrix in said noise period, so that the acquired sound level for said each sound source becomes a desired level and that noise is reduced.

3. The sound acquisition method according to claim 1, in which a loudspeaker for reproducing a received signal received as an electric signal from outside is disposed in said acoustic space, wherein: said state decision step includes a receive decision step of deciding a receiving period from said received signal;

said frequency domain converting step includes a step of converting said received signal to a frequency domain signal;

said covariance matrix calculating step calculates said covariance matrices in said utterance period and said receiving period from said frequency domain acquired signals of said plural channels and said frequency domain received signal;

said covariance matrix storage step stores said covariance matrix corresponding to each sound source in said utterance period and said covariance matrix in said receiving period; and said filter coefficient calculating step calculates said filter coefficients of said plural channels, based on a covariance matrix stored corresponding to said each sound source in said utterance period and a stored covariance matrix in said noise period, so that the acquired sound level for said each sound source becomes a desired level and that noise is reduced.

4. The sound acquisition method according to any one of claims 1, 2 and 3, wherein: the number of said sound sources is K equal to or greater than 2; and said filter coefficient calculating step calculates said filter coefficients after assigning weights $C_{S1}$ to $C_{SK}$ of sensitivity constraints for said K sound sources to covariance matrices corresponding to said K sound sources, said weights assigned to said sound source being reduced in order of utterance of said sound sources.

5. The sound acquisition method according to any one of claims 1, 2 and 3, wherein, assuming that said plural channels are M channels, said filter coefficient calculating step calculates said filter coefficients after whitening each covariance matrix $R_{XX}(\omega)$ by multiplying said each covariance matrix by a weight $1/\{D^H \text{diag}(R_{XX}(\omega))D\}$ based on a diagonal component $\text{diag}(R_{XX}(\omega))$ and a matrix D of arbitrary M or M+1 rows.

6. The sound acquisition method according to any one of claims 1, 2 and 3, wherein said covariance matrix storage step averages a previously stored covariance matrix and a covariance matrix newly calculated by said covariance matrix calculating step and stores the averaged covariance matrix as the current covariance matrix.

7. A computer-readable storage medium storing therein a sound acquisition program for executing said sound acquisition method of claim 1 by a computer.

8. A sound acquisition apparatus which acquires a signal of sound from each sound source by microphones of plural channels placed in an acoustic space, comprising:

a state decision part including an utterance deciding part for deciding an utterance period from signals acquired by said plural-channel microphones;

a sound source position detecting part for detecting the position of said each sound source from said acquired signals when the utterance period is decided by said utterance deciding part;

a frequency domain converting part for converting said acquired signals to frequency domain signals;

a covariance matrix calculating part for calculating a covariance matrix of said frequency domain acquired signals of said plural channels;

a covariance matrix storage part for storing said covariance matrix for said each sound source based on the result of detection by said sound position detecting part;

a filter coefficient calculating part for calculating filter coefficients of said plural channels by use of said stored covariance matrix so that the send signal level for said each sound source becomes a desired level;

filters of said plural channels for filtering the acquired signals from said microphones by use of the filter coefficients of said plural channels, respectively;

an adder for adding together the outputs from said filters of said plural channels and for providing the added output as a send signal; and an acquired sound level estimating part for estimating the acquired sound level for said each sound source from said covariance matrix stored corresponding to said each sound source, and wherein said filter coefficient calculating part is so adapted as to calculate said filter coefficients of said plural channels after assigning a weight to the covariance matrix corresponding to said each sound source based on said estimated acquire sound level so that the send signal level for said each sound source becomes a desired level.

9. A sound acquisition method for acquiring a signal of sound from each of plural sound sources by microphones of plural channels in an acoustic space in which an acoustic signal is reproduced by a loudspeaker from a received signal received as an electric signal from outside, the method comprising:
- a state deciding step including an utterance deciding step of deciding an utterance period and a receiving period from the signal acquired by said microphones of said plural channels and said received signal, respectively;
- a sound source position detecting step of obtaining the position of said plural sound sources from said acquired signals when the utterance period is decided in said utterance deciding step;
- a frequency domain converting step of converting said acquired signal and said received signal to frequency domain signals, respectively;
- a covariance matrix calculating step of calculating a covariance matrix for each detected sound source position in said utterance period and a covariance matrix in said receiving period from said frequency domain acquired signal and said frequency domain received signal, respectively;
- a covariance matrix storage step of storing said covariance matrices for the detected sound source positions in said utterance period and said covariance matrix for said receiving period, respectively;
- a filter coefficient calculating step of calculating filter coefficients for said acquired signals of said plural channels and filter coefficients for said received signal based on said stored covariance matrices in said utterance period and said covariance matrix in said receiving period so that an echo component of the received signal contained in each of said acquired signals is cancelled;
- a filtering step of filtering said received signal and said acquired signal by use of said filter coefficients for said received signal and said filter coefficients for said acquired signals of said plural channels;
- an acquired sound level estimating step of estimating the acquired sound level for utterance from said each sound source based on a covariance matrix stored corresponding to said each sound source, and wherein said filter coefficient calculating part includes a step of calculating said filter coefficients of said plural channels based on said covariance matrix stored corresponding to said each sound source and said estimated acquired sound level so that the output level becomes a desired level; and
- an adding step of adding together all of said filtered signals and providing the added output as a send signal.

10. The sound acquisition method according to claim 9, wherein: said state decision step includes a step of deciding a noise period from said acquired signal and said received signal; said covariance matrix calculating step includes a step of calculating a covariance matrix in said noise period; said covariance matrix storing step includes a step of storing said covariance matrix in said noise period; and said filter coefficient calculating step calculates received signal filter coefficients of said plural channels and acquired signal filter coefficients based on said stored covariance matrices in said utterance period, said receiving period and said noise period so that said acoustic echo and noise are cancelled.

11. The sound acquisition method according to claim 9, wherein said filter coefficient calculating step calculates said filter coefficients after assigning weights $C_{S1}$ to $C_{SK}$ of sensitivity constraints for K sound source positions to covariance matrices corresponding to respective sound sources, said weights assigned to said sound source positions being reduced in order of utterance of said sound sources.

12. The sound acquisition method according to any one of claims 9, 10 and 11, wherein said plural channels are M channels equal to or greater than 2, and said filter coefficient calculating step calculates said filter coefficients after whitening each covariance matrix $R_{XX}(\omega)$ by multiplying said each covariance matrix by a weight $1/\{D^H \text{diag}(R_{XX}(\omega))D\}$ based on a diagonal component $\text{diag}(R_{XX}(\omega))$ and a matrix D of arbitrary M or M+1 rows.

13. The sound acquisition method according to any one of claims 9, 10 and 11, wherein said covariance matrix storage step averages a previously stored covariance matrix and a covariance matrix newly calculated by said covariance matrix calculating step and stores the averaged covariance matrix as the current covariance matrix.

14. A computer-readable storage medium storing therein a sound acquisition program for executing said sound acquisition method of claim 9 by a computer.

15. A sound acquisition apparatus which acquires a signal of sound from each sound source by microphones of plural channels placed in acoustic space, comprising:
- a loudspeaker disposed in the acoustic space for reproducing an acoustic signal from a received signal received as an electric signal from outside;
- a state decision part for deciding an utterance period and a receiving period from said acquired signals acquired by the microphones of said plural channels and said received signal, respectively;
- a frequency domain converting part for converting said acquired signal and said received signal to frequency domain signals, respectively;
- a covariance matrix calculating part for calculating covariance matrices of said frequency domain acquired signals and said frequency domain received signal for said utterance period and for said receiving period, respectively;
- a covariance matrix storage part for storing said covariance matrices for said utterance period and for said receiving period, respectively;
- a filter coefficient calculating part for calculating filter coefficients for said acquired signals of said plural channels and filter coefficients for said received signal based on said stored covariance matrices so that an echo component of said received signal in each of said acquired signals is cancelled;
- acquired signal filters and a received signal filter having set therein said filter coefficients for said acquired signals and said filter coefficients for said received signal, for filtering said acquired signal and for filtering said received signal, respectively;
- an adder for adding together the outputs from said acquired signal filter and said received signal filter, and for providing the added output as a send signal; and
- an acquired sound level estimating part for estimating the acquired sound level for said each sound source from said covariance matrix stored corresponding to said each sound source, and wherein said filter coefficient calculating part is so adapted as to calculate said filter coefficients of said plural channels based on said covariance matrix stored corresponding to said each sound source and said estimated acquired sound level so that the output level becomes a desired level.

16. The sound acquisition apparatus according to claim 15, wherein: said state decision part includes a noise decision part for deciding a noise period from said acquired signals and said received signal; said covariance matrix calculating part is so adapted as to calculate covariance matrices of said acquired signal and said received signal in said noise period; said covariance matrix storage part is so adapted as to store said covariance matrices in said noise period; and said filter coefficient calculating part is so adapted as to calculate filter coefficients of said plural channels based on said stored covariance matrices so that an acoustic echo and noise of said received signal are cancelled, and as to set the calculated filter coefficients in said filters of said plural channels.

17. The sound acquisition apparatus according to claim 16, which further comprises a sound source position detecting part for detecting positions of K sound sources based on acquired signals of said plural channels; and wherein said covariance matrix calculating part is so adapted as to calculate a covariance matrix in said utterance period for each sound source; said covariance matrix storage part is so adapted as to store said covariance matrix in said utterance period in correspondence to each sound source; and said filter coefficient calculating part includes means for calculating said filter coefficients after assigning weights $C_{S1}$ to $C_{SK}$ of sensitivity constraints for the respective sound sources to covariance matrices corresponding to said respective sound sources, said weights assigned to said sound sources being reduced in order of utterance of said sound sources.

* * * * *